US012438276B2

(12) United States Patent
Sakr

(10) Patent No.: US 12,438,276 B2
(45) Date of Patent: Oct. 7, 2025

(54) CIRCULARLY-POLARIZED ANTENNAS WITH WIDE SCANNING RANGES

(71) Applicant: Analog Devices International Unlimited Company, Limerick (IE)

(72) Inventor: Ahmed A. Sakr, New Cairo (EG)

(73) Assignee: Analog Devices International Unlimited Company, Limerick (IE)

( * ) Notice: Subject to any disclaimer, the term of this patent is extended or adjusted under 35 U.S.C. 154(b) by 157 days.

(21) Appl. No.: 18/259,729

(22) PCT Filed: Jan. 21, 2022

(86) PCT No.: PCT/EP2022/051384

§ 371 (c)(1),
(2) Date: Jun. 28, 2023

(87) PCT Pub. No.: WO2022/161873

PCT Pub. Date: Aug. 4, 2022

(65) Prior Publication Data

US 2024/0055765 A1 Feb. 15, 2024

Related U.S. Application Data

(60) Provisional application No. 63/142,212, filed on Jan. 27, 2021.

(51) Int. Cl.
*H01Q 9/04* (2006.01)
*H01Q 21/06* (2006.01)

(52) U.S. Cl.
CPC ........... *H01Q 9/0435* (2013.01); *H01Q 9/045* (2013.01); *H01Q 21/065* (2013.01)

(58) Field of Classification Search
CPC ........ H01Q 1/281; H01Q 5/378; H01Q 9/045; H01Q 9/0407; H01Q 9/0414;
(Continued)

(56) References Cited

U.S. PATENT DOCUMENTS 8,502,735 B1 * 8/2013 Moosbrugger .......... H01Q 3/30 343/702
10,686,258 B2 * 6/2020 Zihir ........................ H01Q 3/46
(Continued)

FOREIGN PATENT DOCUMENTS

CN 208014900 10/2018
EP 0434268 6/1991
(Continued)

OTHER PUBLICATIONS

Notice of Reasons for Refusal issued in Japanese Patent Application No. 2023-544733, dated Aug. 26, 2024.
(Continued)

*Primary Examiner* — Tung X Le
(74) *Attorney, Agent, or Firm* — Knobbe, Martens, Olson & Bear, LLP

(57) ABSTRACT

New antenna designs for realizing circularly-polarized antennas with a wide scanning range are disclosed. The designs are based on arranging four sequentially fed antenna patches to be considered as a single antenna element, referred to as a "super-element," in the overall phased array. An example super-element includes relatively short transmission lines to provide excitations for the vertically and horizontally polarized fields, with the transmission lines for the vertically and horizontally polarized fields being perpendicular to one other. A parasitic transmission line may be placed around a part of each antenna patch of the super-element to serve as a coupler to further enforce the field vector direction for keeping the circular polarization. With such designs, an axial ratio below 3.6 dB for scanning angles of at least 75 degrees at 39.5 GHz may be achieved.

20 Claims, 8 Drawing Sheets

(58) Field of Classification Search
CPC .. H01Q 9/0435; H01Q 9/0442; H01Q 9/0457; H01Q 9/0471; H01Q 19/005; H01Q 21/065; H01Q 21/205
See application file for complete search history.

(56) References Cited

U.S. PATENT DOCUMENTS

| | | | | |
|---|---|---|---|---|
| 11,011,853 | B2 * | 5/2021 | Corman | H01Q 1/245 |
| 2004/0070536 | A1 | 4/2004 | Stotler et al. | |
| 2013/0265203 | A1 * | 10/2013 | Ermutlu | H01Q 9/0457 343/703 |
| 2014/0247194 | A1 * | 9/2014 | Durnan | H01Q 3/26 343/867 |
| 2020/0295463 | A1 | 9/2020 | Yamada et al. | |
| 2022/0181766 | A1 * | 6/2022 | Mori | H01Q 5/378 |
| 2023/0223707 | A1 * | 7/2023 | Franson | H01Q 21/065 343/893 |

FOREIGN PATENT DOCUMENTS

| | | |
|---|---|---|
| EP | 3422465 | 1/2019 |
| JP | 2012-204916 A | 10/2012 |
| WO | WO 2017/145968 | 12/2018 |
| WO | WO 2019/208022 | 3/2021 |
| WO | WO 2020/217971 | 5/2021 |

OTHER PUBLICATIONS

Chieh et al., "Development of Flat Panel Active Phased Array Antennas Using 5G Silicon RFICs at KU- and Ka-Bands", IEEE, Oct. 20, 2020, 8: 192669-192681.
International Search Report issued in International Application No. PCT/EP2022/051384, dated May 19, 2022.
Written Opinion issued in International Application No. PCT/EP2022/051384, dated May 19, 2022.
Liu et al., "A Low-Profile Circularly Polarized Metasurface Antenna With Wide Axial-Ratio Beamwidth," IEEE Antennas and Wireless Propagation Letters, Jul. 2019, 18(7): 1438-1442.
Yang et al., "A low-profile wideband circularly polarized crossed-dipole antenna with wide axial-ratio and gain beamwidths," IEEE Trans. Antennas Propag., Jul. 2018, 66(7): 3346-3353.
Zheng et al., "Axial-ratio beamwidth and gain enhanced circularly polarized antenna using parasitic elements," Microw. Opt. Technol. Lett., 2017, 59(11): 2922-2929.
Notice of Allowance issued in Japanese Application No. 2023-544733, dated Feb. 12, 2025.

* cited by examiner

CIRCULARLY-POLARIZED ANTENNAS WITH WIDE SCANNING RANGES

CROSS REFERENCE TO RELATED APPLICATIONS

This application is a U.S. national phase application of International Application No. PCT/EP2022/051384, filed Jan. 21, 2022, titled "CIRCULARLY-POLARIZED ANTENNAS WITH WIDE SCANNING RANGES," which is related to, and claims priority from, U.S. Patent Application No. 63/142,212, filed Jan. 27, 2021, titled "CIRCULARLY-POLARIZED ANTENNAS WITH WIDE SCANNING RANGES," the disclosures of each of which are hereby incorporated by reference herein in their entities.

TECHNICAL FIELD OF THE DISCLOSURE

The present disclosure generally relates to radio frequency (RF) systems and, more particularly, to antennas used in RF systems.

BACKGROUND

RF systems are systems that transmit and receive signals in the form of electromagnetic waves in the RF range of approximately 3 kilohertz (kHz) to 300 gigahertz (GHz). Radio systems are commonly used for wireless communications, with cellular/wireless mobile technology being a prominent example.

In context of RF systems, an antenna is a device that serves as the interface between radio waves propagating wirelessly through space and electric currents moving in metal conductors used with a transmitter or receiver. During transmission, a radio transmitter supplies an electric current to the antenna's terminals, and the antenna radiates the energy from the current as radio waves. During reception, an antenna intercepts some of the power of a radio wave in order to produce an electric current at its terminals, which current is subsequently applied to a receiver to be amplified. Antennas are essential components of all radio equipment, and are used in radio broadcasting, broadcast television, two-way radio, communications receivers, radar, cell phones, satellite communications and other devices.

An antenna with a single antenna element will typically broadcast a radiation pattern that radiates equally in all directions in a spherical wavefront. Phased array antennas generally refer to a collection of antenna elements that are used to focus electromagnetic energy in a particular direction, thereby creating a main beam. Phased array antennas offer numerous advantages over single antenna systems, such as high gain, ability to perform directional steering, and simultaneous communication. Therefore, phased array antennas are being used more frequently in a myriad of different applications, such as in military applications, mobile technology, on airplane radar technology, automotive radars, cellular telephone and data, and Wi-Fi technology.

BRIEF DESCRIPTION OF THE DRAWINGS

To provide a more complete understanding of the present disclosure and features and advantages thereof, reference is made to the following description, taken in conjunction with the accompanying figures, wherein like reference numerals represent like parts, in which.

DESCRIPTION OF EXAMPLE EMBODIMENTS OF THE DISCLOSURE

Figure 1:
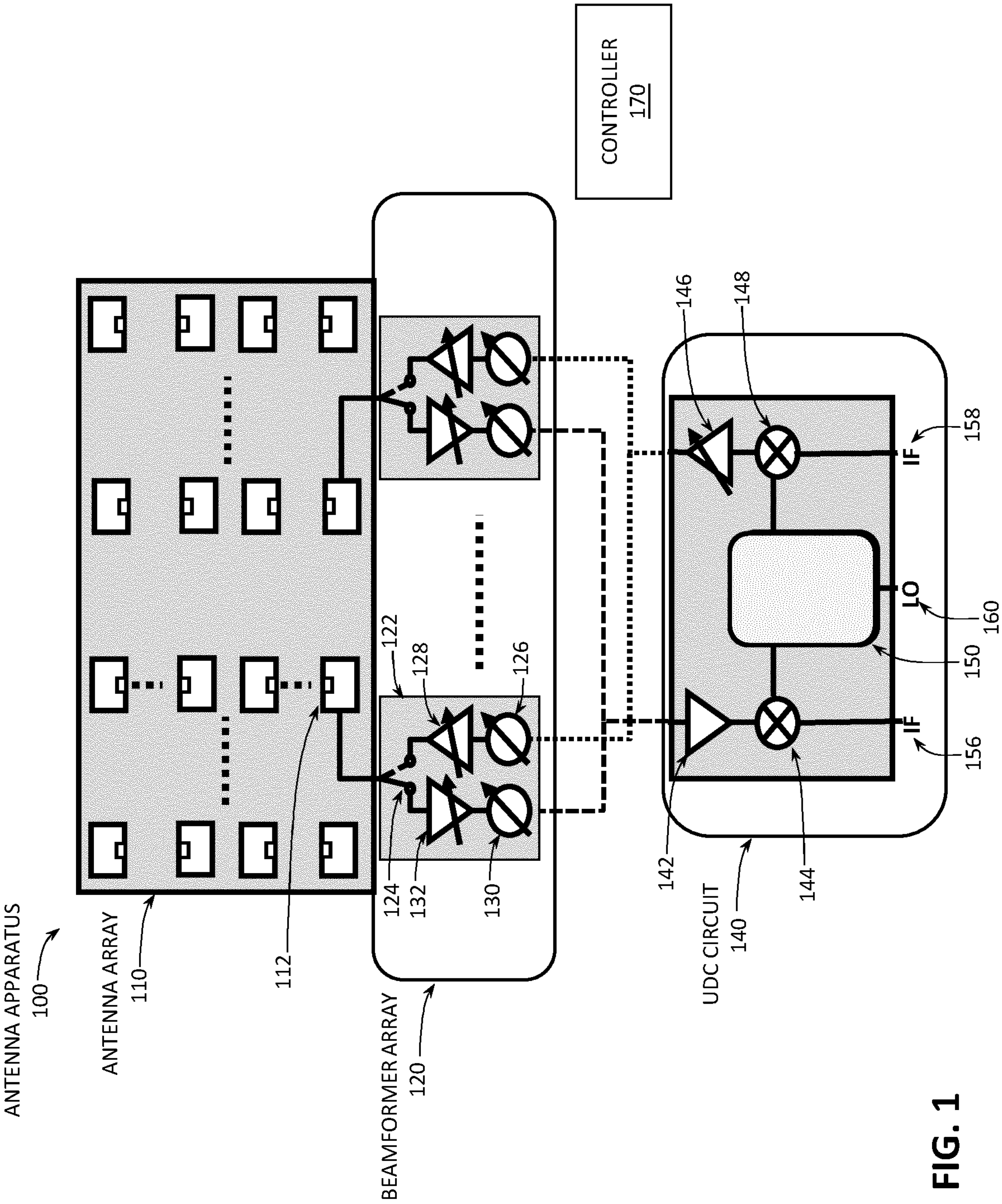
FIG. 1 provides a schematic illustration of an example antenna apparatus in which circularly-polarized antennas with wide scanning ranges may be implemented, according to some embodiments of the present disclosure.

The systems, methods and devices of this disclosure each have several innovative aspects, no single one of which is solely responsible for all of the desirable attributes disclosed herein. Details of one or more implementations of the subject matter described in this specification are set forth in the description below and the accompanying drawings.

For purposes of illustrating circularly-polarized antennas with wide scanning ranges, proposed herein, it might be useful to first understand phenomena that may come into play in antennas. The following foundational information may be viewed as a basis from which the present disclosure may be properly explained. Such information is offered for purposes of explanation only and, accordingly, should not be construed in any way to limit the broad scope of the present disclosure and its potential applications.

As described above, phased array antennas generally refer to a collection of antenna elements that are used to focus RF energy in a particular direction, thereby creating a main beam. In particular, the individual antenna elements of a phased array antenna may radiate in a spherical pattern, but, collectively, a plurality of such antenna elements may be configured to generate a wavefront in a particular direction through constructive and destructive interference. The relative phases of the signal transmitted at each antenna element can be either fixed or adjusted, allowing the antenna system to steer the wavefront in different directions. A phased array antenna typically includes an oscillator, a plurality of antenna elements, a phase adjuster or shifter, a variable gain amplifier, a receiver, and a control processor. A phased array antenna system uses phase adjusters or shifters to control the phase of the signal transmitted by an antenna element. The radiated patterns of the antenna elements constructively interfere in a target direction creating a wavefront in that direction called the main beam (also referred to as "lobe"). The phased array antennas can realize increased gain and improve signal to interference plus noise ratio in the direction of the main beam. The radiation pattern destructively interferes in several other directions other than the direction of the main beam and can reduce gain in those directions.

"Beam scanning" refers to changing (e.g., scanning) the direction of the main beam of an antenna element. In this context, "broadside" refers to the direction of the main beam that is perpendicular to the plane of the antenna element. With current fifth generation cellular (5G) (e.g., millimeter-wave (mm-wave) technology) applications, there is a need for aggressive scanning angles that might go up to at least 70 degrees away from the broadside (in the following, the term "scanning angle" refers to the angle between the direction of the main beam of an antenna element and the broadside). There is also a need for using circularly-polarized antennas (e.g., antenna elements having a plane of polarization that rotates in a corkscrew pattern making one complete revolution during each wavelength) because such antennas may be particularly advantageous (e.g., compared to linearly polarized antennas) in terms of reflectivity, absorption, multi-path, and phasing issues. Unfortunately, using conventional circularly-polarized antennas present significant challenges for realizing wide scanning ranges. In particular, in order to realize circular polarization of an antenna element, an axial ratio of the antenna element should be as close to 1 (or 0 decibel (dB)) as possible, where the axial ratio is defined as the ratio between the minor and major axis of the polarization ellipse. However, as the scanning angle increases, it is extremely difficult to maintain the axial ratio sufficiently close to 0 dB when conventional circularly-polarized antennas are used.

Embodiments of the present disclosure provide new antenna designs for realizing circularly-polarized antennas with a wide scanning range. The designs are based on arranging four sequentially fed antenna patches to be considered as a single antenna element, referred to as a "super-element," in the overall phased array. An example super-element includes relatively short transmission lines to provide excitations for the vertically and horizontally polarized fields, with the transmission lines for the vertically and horizontally polarized fields being perpendicular to one other. A parasitic transmission line (e.g., a transmission line that may be electrically floating during operation of the antenna) may be placed around a part of each antenna patch of the super-element (e.g., around each of the four sequentially fed antenna patches) to serve as a coupler to further enforce the field vector direction for keeping the circular polarization. With such designs, an axial ratio below 3.6 dB for scanning angles of at least 75 degrees at 39.5 GHz may be achieved. While not limited to, circularly-polarized antennas with wide scanning ranges, disclosed herein, may be particularly beneficial for use in 5G communications, e.g., in mm-wave or sub-6 GHz, applications.

As will be appreciated by one skilled in the art, aspects of the present disclosure, in particular aspects of circularly-polarized antennas with wide scanning ranges as proposed herein, may be embodied in various manners, e.g., as a method, a system, a computer program product, or a computer-readable storage medium. Accordingly, aspects of the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Functions described in this disclosure may be implemented as an algorithm executed by one or more hardware processing units, e.g., one or more microprocessors of one or more computers. In various embodiments, different steps and portions of the steps of each of the methods described herein may be performed by different processing units.

The following detailed description presents various descriptions of specific certain embodiments. However, the innovations described herein can be embodied in a multitude of different ways, for example, as defined and covered by the select examples. In the following description, reference is made to the drawings, where like reference numerals can indicate identical or functionally similar elements. It will be understood that elements illustrated in the drawings are not necessarily drawn to scale. Moreover, it will be understood that certain embodiments can include more elements than illustrated in a drawing and/or a subset of the elements illustrated in a drawing. Further, some embodiments can incorporate any suitable combination of features from two or more drawings.

The description may use the phrases "in an embodiment" or "in embodiments," which may each refer to one or more of the same or different embodiments. Unless otherwise specified, the use of the ordinal adjectives "first," "second," and "third," etc., to describe a common object, merely indicate that different instances of like objects are being referred to and are not intended to imply that the objects so described must be in a given sequence, either temporally, spatially, in ranking or in any other manner. Furthermore, for the purposes of the present disclosure, the phrase "A and/or B" or notation "A/B" means (A), (B), or (A and B), while the phrase "A, B, and/or C" means (A), (B), (C), (A and B), (A and C), (B and C), or (A, B, and C). As used herein, the notation "A/B/C" means (A, B, and/or C). The term "between," when used with reference to measurement ranges, is inclusive of the ends of the measurement ranges.

Various aspects of the illustrative embodiments are described using terms commonly employed by those skilled in the art to convey the substance of their work to others skilled in the art. For example, the term "connected" means a direct electrical connection between the things that are connected, without any intermediary devices/components, while the term "coupled" means either a direct electrical connection between the things that are connected, or an indirect electrical connection through one or more passive or active intermediary devices/components. In another example, the terms "circuit" or "circuitry" (which may be used interchangeably) refer to one or more passive and/or active components that are arranged to cooperate with one another to provide a desired function. Sometimes, in the present descriptions, the term "circuit" may be omitted (e.g., an upconverter and/or downconverter (UDC) circuit may be referred to simply as a "UDC," etc.). If used, the terms "substantially," "approximately," "about," etc., may be used to generally refer to being within +/−20% of a target value, e.g., within +/−10% of a target value, based on the context of a particular value as described herein or as known in the art.

FIG. 1 provides a schematic illustration of an antenna apparatus 100, e.g., a phased array system/apparatus, in which circularly-polarized antennas with wide scanning ranges may be implemented, according to some embodiments of the present disclosure. As shown in FIG. 1, the system 100 may include an antenna array 110, a beamformer array 120, a UDC circuit 140, and a controller 170.

In general, the antenna array 110 may include a plurality of antenna elements 112 (only one of which is labeled with a reference numeral in FIG. 1 in order to not clutter the drawing), housed in (e.g., in or over) a substrate 114, where the substrate 114 may be, e.g., a printed circuit board (PCB) or any other support structure. In various embodiments, the antenna elements 112 may be radiating elements or passive elements. For example, the antenna elements 112 may include dipoles, open-ended waveguides, slotted waveguides, microstrip antennas, and the like. In some embodiments, the antenna elements 112 may include any suitable elements configured to wirelessly transmit and/or receive RF signals. The antenna array 110 may be a phased array antenna and, therefore, will be referred to as such in the following. In some embodiments, the phased array antenna 110 may be a printed phased array antenna.

At least some of the antenna elements 112 may be implemented as super-elements proposed herein, configured to realize circularly-polarized antennas while extending the scanning range of the phased array antenna 110. For example, each of the antenna elements 112 may be implemented as a super-element according to any of the embodiments disclosed herein. Further details shown in FIG. 1, such as the particular arrangement of the beamformer array 120, of the UDC circuit 140, and the relation between the beamformer array 120 and the UDC circuit 140 may be different in different embodiments, with the description of FIG. 1 providing only some examples of how these components may be used together with the phased array antenna 110 being configured as a phased array antenna implementing circularly-polarized antennas with wide scanning ranges. Furthermore, although some embodiments shown in the present drawings illustrate a certain number of components (e.g., a certain number of antenna elements 112, beamformers, and/or UDC circuits), it is appreciated that these embodiments may be implemented with any number of these components in accordance with the descriptions provided herein. Furthermore, although the disclosure may discuss certain embodiments with reference to certain types of components of an antenna apparatus (e.g., referring to a substrate that houses antenna element as a PCB although in general it may be any suitable support structure), it is understood that the embodiments disclosed herein may be implemented with different types of components.

The beamformer array 120 may include a plurality of, beamformers 122 (only one of which is labeled with a reference numeral in FIG. 1 in order to not clutter the drawing). The beamformers 122 may be seen as transceivers (e.g., devices which may transmit and/or receive signals, in this case—RF signals) that feed to antenna elements 112. In some embodiments, a single beamformer 122 may be associated with (e.g., exchange signals with, e.g., feed signals to) one of the antenna elements 112 (e.g., in a one-to-one correspondence). In other embodiments, multiple beamformers 122 may be associated with a single antenna element 112. Yet in other embodiments, a single beamformer 122 may be associated with a plurality of antenna elements 112. When a given antenna element 112 is implemented as a super-element, e.g., the super-element 200 shown in FIGS. 2A-2B, a single beamformer 122 may be configured to support signals for multiple patches (e.g., 4 patches 210) of such a super-element.

In some embodiments, each of the beamformers 122 may include a switch 124 to switch the path from the corresponding antenna element 112 to the receiver or the transmitter path. Although not specifically shown in FIG. 1, in some embodiments, each of the beamformers 122 may also include another switch to switch the path from a signal processor (also not shown) to the receiver or the transmitter path. As shown in FIG. 1, in some embodiments, the transmit path (TX path) of each of the beamformers 122 may include a phase shifter 126 and a variable (e.g., programmable) gain amplifier 128, while the receive path (RX path) may include a phase adjusted 130 and a variable (e.g., programmable) gain amplifier 132. The phase shifter 126 may be configured to adjust the phase of the RF signal to be transmitted (TX signal) by the antenna element 112 and the variable gain amplifier 128 may be configured to adjust the amplitude of the TX signal to be transmitted by the antenna element 112. Similarly, the phase shifter 130 and the variable gain amplifier 132 may be configured to adjust the RF signal received (RX signal) by the antenna element 112 before providing the RX signal to further circuitry, e.g., to the UDC circuit 140, to the signal processor (not shown), etc. The beamformers 122 may be considered to be "in the RF path" of the antenna apparatus 100 because the signals traversing the beamformers 122 are RF signals (e.g., TX signals which may traverse the beamformers 122 are RF signals upconverted by the UDC circuit 140 from lower frequency signals, e.g., from intermediate frequency (IF) signals or from baseband signals, while RX signals which may traverse the beamformers 122 are RF signals which have not yet been down converted by the UDC circuit 140 to lower frequency signals, e.g., to IF signals or to baseband signals).

Although a switch is shown in FIG. 1 to switch from the transmitter path to the receive path (e.g., the switch 124), in other embodiments of the beamformer 122, other components can be used, such as a duplexer. Furthermore, although FIG. 1 illustrates an embodiment where the beamformers 122 include the phase shifters 126, 130 (which may also be referred to as "phase adjusters") and the variable gain amplifiers 128, 132, in other embodiments, any of the beamformers 122 may include other components to adjust the magnitude and/or the phase of the TX and/or RX signals. In some embodiments, one or more of the beamformers 122 may not include the phase shifter 126 and/or the phase shifter 130 because the desired phase adjustment may, alternatively, be performed using a phase shift module in the local oscillator (LO) path. In other embodiments, phase adjustment performed in the LO path may be combined with phase adjustment performed in the RF path using the phase shifters of the beamformers 122.

Turning to the details of the UDC, in general, the UDC circuit 140 may include an upconverter and/or downconverter circuitry, e.g., in various embodiments, the UDC circuit 140 may include 1) an upconverter circuit but no downconverter circuit, 2) a downconverter circuit but no upconverter circuit, or 3) both an upconverter circuit and a downconverter circuit. As shown in FIG. 1, in some embodiments, the downconverter circuit of the UDC circuit 140 may include an amplifier 142 and a mixer 144, while the upconverter circuit of the UDC circuit 140 may include an amplifier 146 and a mixer 148. In some embodiments, the UDC circuit 140 may further include a phase shift module 150.

In various embodiments, the term "UDC circuit" may be used to include frequency conversion circuitry (e.g., a frequency mixer configured to perform upconversion to RF signals for wireless transmission, a frequency mixer configured to perform downconversion of received RF signals, or both), as well as any other components that may be included in a broader meaning of this term, such as filters, analogto-digital converters (ADCs), digital-to-analog converters (DACs), transformers, and other circuit elements typically used in association with frequency mixers. In all of these variations, the term "UDC circuit" covers implementations where the UDC circuit 140 only includes circuit elements related to the TX path (e.g., only an upconversion mixer but not a downconversion mixer; in such implementations the UDC circuit may be used as/in an RF transmitter for generating RF signals for transmission), implementations where the UDC circuit 140 only includes circuit elements related to the RX path (e.g., only an downconversion mixer but not an upconversion mixer; in such implementations the UDC circuit 140 may be used as/in an RF receiver to downconvert received RF signals, e.g., the UDC circuit 140 may enable an antenna element of the phased array antenna 110 to act, or be used, as a receiver), as well as implementations where the UDC circuit 140 includes, both, circuit elements of the TX path and circuit elements of the RX path (e.g., both the upconversion mixer and the downconversion mixer; in such implementations the UDC circuit 140 may be used as/in an RF transceiver, e.g., the UDC circuit 140 may enable an antenna element of the phased array antenna 110 to act, or be used, as a transceiver).

Although a single UDC circuit 140 is illustrated in FIG. 1, multiple UDC circuits 140 may be included in the antenna apparatus 100 to provide upconverted RF signals to and/or receive RF signals to be downconverted from any one of the beamformers 122. Each UDC circuit 140 may be associated with a plurality of beamformers 122 of the beamformer array 120, e.g., using a splitter/combiner 130. This is schematically illustrated in FIG. 1 with dashed lines and dotted lines within the splitter/combiner 130 connecting various elements of the beamformer array 120 and the UDC circuit 140. Namely, FIG. 1 illustrates that the dashed lines connect the downconverter circuit of the UDC circuit 140 (namely, the amplifier 142) to the RX paths of two different beamformers 122, and that the dotted lines connect the upconverter circuit of the UDC circuit 140 (namely, the amplifier 146) to the TX paths of two different beamformers 122. For example, there may be 96 beamformers 122 in the beamformer array 120, associated with 96 single-polarized antenna elements 112 of the phased array antenna 110.

In some embodiments, the mixer 144 in the downconverter path (e.g., RX path) of the UDC circuit 140 may have [at least] two inputs and one output. One of the inputs of the mixer 144 may include an input from the amplifier 142, which may, e.g., be a low-noise amplifier (LNA). The second input of the mixer 144 may include an input indicative of the LO signal 160. In some embodiments, phase shifting may be implemented in the LO path (additionally or alternatively to the phase shifting in the RF path), in which case the LO signal 160 may be provided, first, to a phase shift module 150, and then a phase-shifted LO signal 160 is provided as the second input to the mixer 144. In the embodiments where phase shifting in the LO path is not implemented, the phase shift module 150 may be absent and the second input of the mixer 144 may be configured to receive the LO signal 160. The one output of the mixer 144 is an output to provide the downconverted signal 156, which may, e.g., be an IF signal 156. The mixer 144 may be configured to receive an RF RX signal from the RX path of one of the beamformers 122, after it has been amplified by the amplifier 142, at its first input and receive either a signal from the phase shift module 150 or the LO signal 160 itself at its second input, and mix these two signals to downconvert the RF RX signal to a lower frequency, producing the downconverted RX signal 156, e.g., the RX signal at the IF. Thus, the mixer 144 in the downconverter path of the UDC circuit 140 may be referred to as a "downconverting mixer."

In some embodiments, the mixer 148 in the upconverter path (e.g., TX path) of the UDC circuit 140 may have, at least, two inputs and one output. The first input of the mixer 148 may be an input for receiving a TX signal 158 of a lower frequency, e.g., the TX signal at IF. The second input of the mixer 148 may include an input indicative of the LO signal 160. In the embodiments where phase shifting is implemented in the LO path (either additionally or alternatively to the phase shifting in the RF path), the LO signal 160 may be provided, first, to a phase shift module 150, and then a phase-shifted LO signal 160 is provided as the second input to the mixer 148. In the embodiments where phase shifting in the LO path is not implemented, the phase shift module 150 may be absent and the second input of the mixer 148 may be configured to receive the LO signal 160. The one output of the mixer 148 is an output to the amplifier 146, which may, e.g., be a power amplifier (PA). The mixer 148 may be configured to receive an IF TX signal 158 (e.g., the lower frequency, e.g., IF, signal to be transmitted) at its first input and receive either a signal from the phase shift module 150 or the LO signal 160 itself at its second input, and mix these two signals to upconvert the IF TX signal to the desired RF frequency, producing the upconverted RF TX signal to be provided, after it has been amplified by the amplifier 146, to the TX path of one of the beamformers 122. Thus, the mixer 148 in the upconverter path of the UDC circuit 140 may be referred to as a "upconverting mixer."

In some embodiments, the amplifier 128 may be a PA and/or the amplifier 132 may be an LNA.

As is known in communications and electronic engineering, an IF is a frequency to which a carrier wave is shifted as an intermediate step in transmission or reception. The IF signal may be created by mixing the carrier signal with an LO signal in a process called heterodyning, resulting in a signal at the difference or beat frequency. Conversion to IF may be useful for several reasons. One reason is that, when several stages of filters are used, they can all be set to a fixed frequency, which makes them easier to build and to tune. Another reason is that lower frequency transistors generally have higher gains so fewer stages may be required. Yet another reason is to improve frequency selectivity because it may be easier to make sharply selective filters at lower fixed frequencies. It should also be noted that, while some descriptions provided herein refer to signals 156 and 158 as IF signals, these descriptions are equally applicable to embodiments where signals 156 and 158 are baseband signals. In such embodiments, frequency mixing of the mixers 144 and 148 may be a zero-IF mixing (also referred to as a "zero-IF conversion") in which the LO signal 160 used to perform the mixing may have a center frequency in the band of RF RX/TX frequencies.

Although not specifically shown in FIG. 1, in further embodiments, the UDC circuit 140 may further include a balancer, e.g., in each of the TX and RX paths, configured to mitigate imbalances in the in-phase and quadrature (IQ) signals due to mismatching. Furthermore, although also not specifically shown in FIG. 1, in other embodiments, the antenna apparatus 100 may include further instances of a combination of the phased array antenna 110, the beamformer array 120, and the UDC circuit 140 as described herein.

The controller 170 may include any suitable device, configured to control operation of various parts of the antenna apparatus 100. For example, in some embodiments, the controller 170 may control the amount and the timing of phase shifting implemented in the antenna apparatus 100. In another example, in some embodiments, the controller 170 may control various signals, as well as the timing of those signals, provided to the circularly-polarized antennas with wide scanning ranges implemented in the antenna array 110.

The antenna apparatus 100 can steer an electromagnetic radiation pattern of the phased array antenna 110 in a particular direction, thereby enabling the phased array antenna 110 to generate a main beam in that direction and side lobes in other directions. The main beam of the radiation pattern is generated based on constructive inference of the transmitted RF signals based on the transmitted signals' phases. The side lobe levels may be determined by the amplitudes of the RF signals transmitted by the antenna elements. The antenna apparatus 100 can generate desired antenna patterns by providing phase shifter settings for the antenna elements 112, e.g., using the phase shifters of the beamformers 122 and/or the phase shift module 150.

Figure 2A:
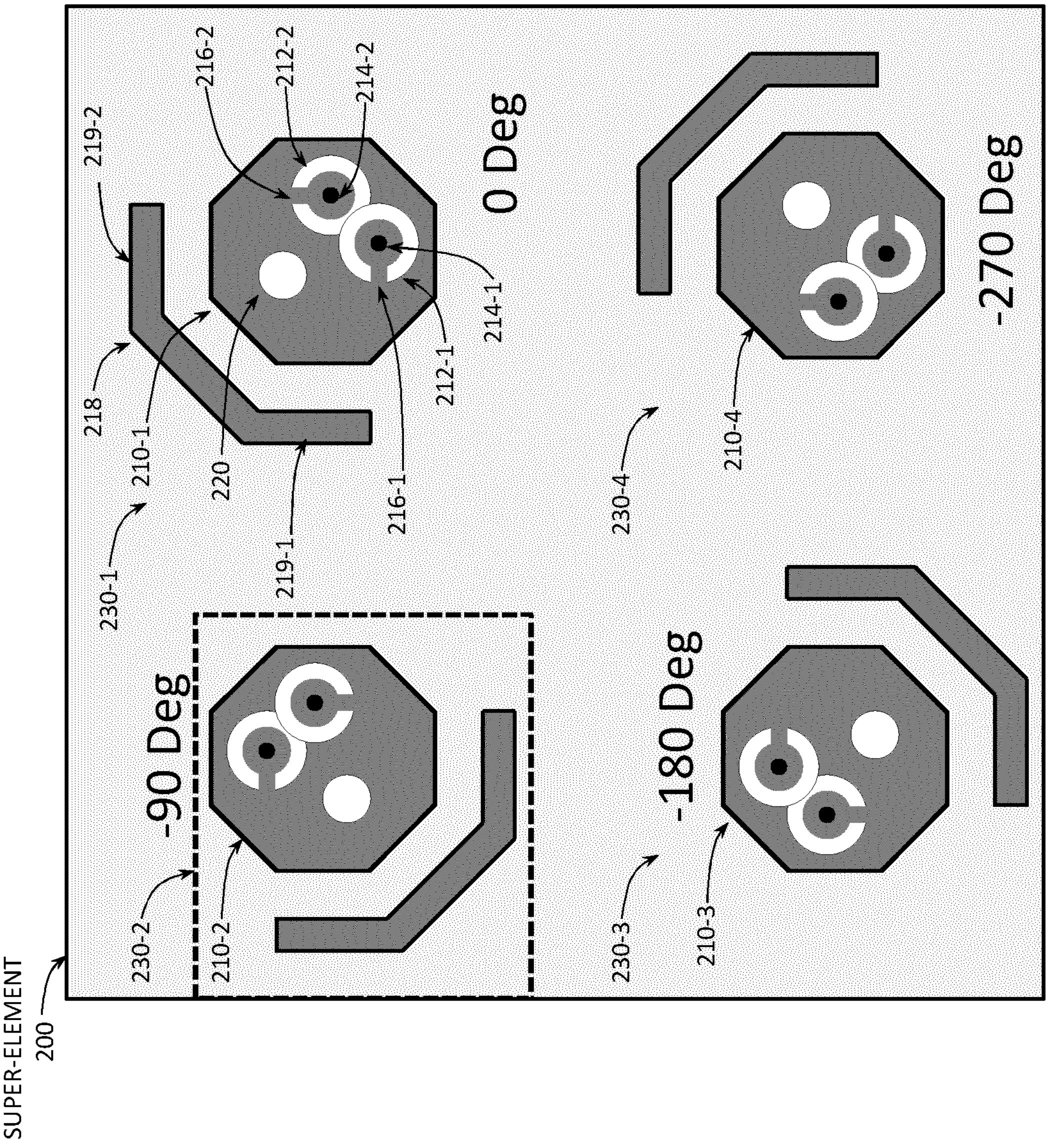
FIGS. 2A-2B provide schematic illustrations of an example antenna super-element that may be used to implement a circularly-polarized antenna with a wide scanning range, according to some embodiments of the present disclosure.
Figure 2B:
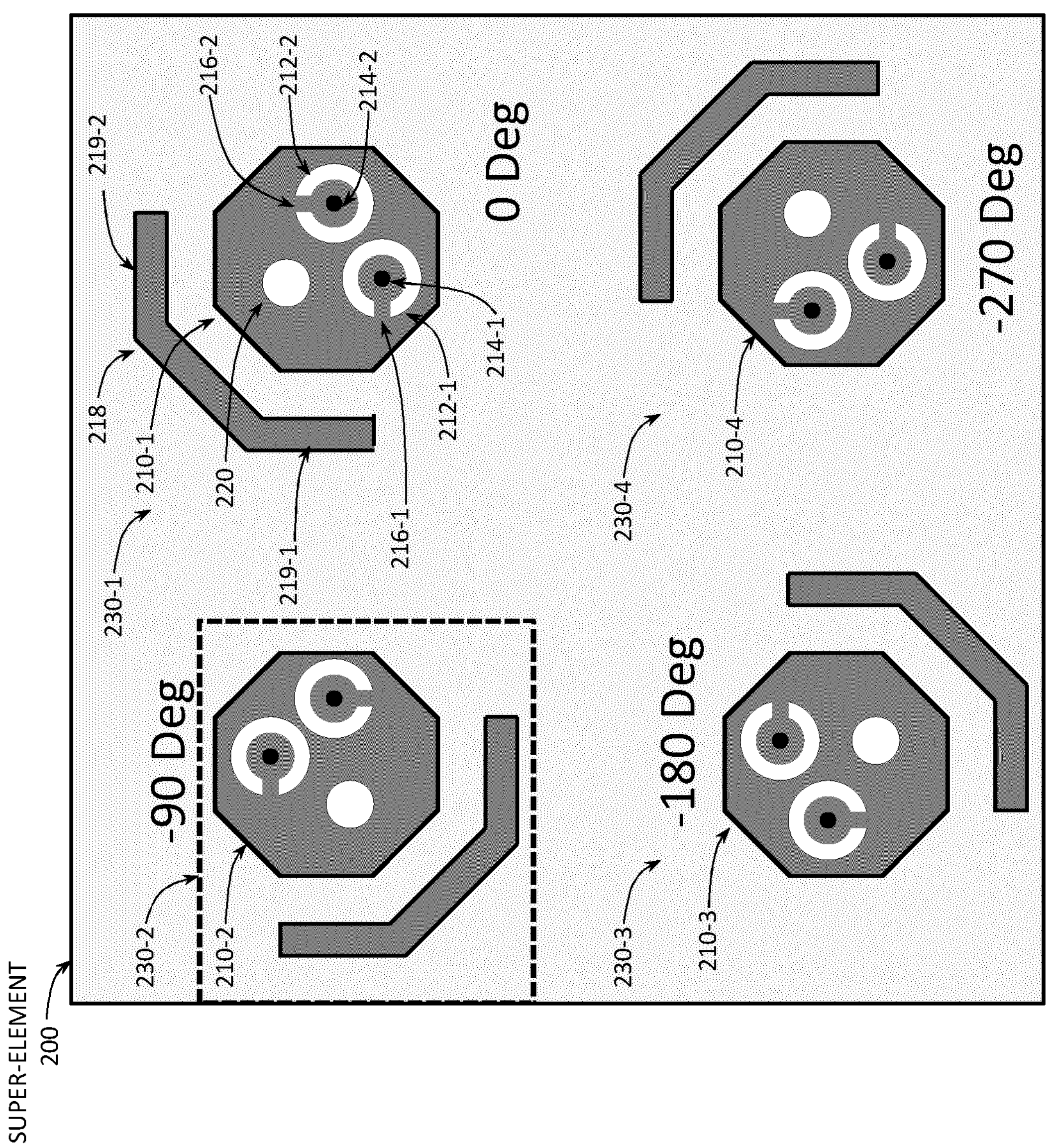

FIGS. 2A-2B provide schematic illustrations of an example antenna super-element 200 that may be used to implement a circularly-polarized antenna with a wide scanning range, according to some embodiments of the present disclosure. The super-element 200 may be an example of one of the antenna elements 112 of the antenna apparatus 100 shown in FIG. 1.

As shown in FIG. 2A, the super-element 200 may include a plurality of patches 210, e.g., four patches 210-1 through 210-4. Each of the patches 210 may be a sequentially fed antenna. Different patches 210 may be sequentially fed with signals having phases that differ sequentially by 90 degrees, e.g., the first patch 210-1 may be fed with a signal with a phase of 0 degrees, the second patch 210-2 may be fed with a signal with a phase of −90 degrees, the third patch 210-3 may be fed with a signal with a phase of −180 degrees, and the fourth patch 210-4 may be fed with a signal with a phase of −270 degrees. Each patch 210 may be provided as a layer of a suitable electrically conductive material, shaped into a patch, e.g., as shown in FIG. 2A (the grey color in FIG. 2A indicates electrically conductive materials). The patches 210 are now described with reference to the patch 210-1 (with the analogous descriptions being applicable to other patches 210 of the super-element 200).

As shown in FIG. 2A, the patch 210-1 may include two ring-shaped openings 212-1 and 212-2, which are openings (e.g., discontinuities) in the electrically conductive material of the patch 210-1. A respective excitation via 214 may be arranged to couple to the electrically conductive material enclosed by each of the openings 212, e.g., to couple substantially to the center of the electrically conductive material enclosed by each of the openings 212, as shown in FIG. 2A with an excitation via 214-1 coupling to the electrically conductive material enclosed by the opening 212-1 and an excitation via 214-2 coupling to the electrically conductive material enclosed by the opening 212-2. A point, representing a region where a given excitation via 214 couples (e.g., contacts) the electrically conductive material enclosed by a respective one of the openings 212, may be referred to as a "connection point" in the layer in which the antenna patches 210 are provided.

As shown in FIG. 2A, the openings 212 are not complete ring-shaped openings. Rather, the ring of each of the openings 212 is interrupted by a portion of the electrically conductive material that is continuous with the electrically conductive material within the opening 212 and the electrically conductive material within the patch 210-1 but outside of the opening 212. Such a portion of the electrically conductive material coupling the electrically conductive material within the opening 212 and the electrically conductive material within the patch 210-1 but outside of the opening 212 may be referred to as a relatively short "transmission line" (which may also be referred to as an "excitation line"), labeled in FIG. 2A as a transmission line 216-1 interrupting the ring of the opening 212-1 and as a transmission line 216-2 interrupting the ring of the opening 212-2.

Each of the vias 214-1 and 214-2 is configured to support signals with polarizations that are orthogonal to one other. The transmission lines 216-1 and 216-2 are oriented in the direction corresponding to the polarization of the signals supported by the respective vias 214. For example, the via 214-1 may be configured to support signals with horizontal polarization and, therefore, the transmission line 216-1 is oriented horizontally, while the via 214-2 may be configured to support signals with vertical polarization and, therefore, the transmission line 216-2 is oriented vertically. This is in sharp contrast to conventional implementations of circularly-polarized antennas using sequentially fed patches, where a single feeding via was connected to each patch. By separating the feeding vias into two feeding vias 214 supporting orthogonal polarizations and enforcing each polarization using a respective transmission line 216 within a given patch 210, lower values of the axial ratio may be achieved for wider scanning angles.

As also shown in FIG. 2A, in some embodiments, each of the patches 210 may be associated with a respective parasitic transmission line 218, providing an additional way to enforce circular polarization (e.g., to realize low values of the axial ratio) for wider scanning angles. A portion 219-2 of the parasitic transmission line 218 may act as a vertical coupler that enforces the electric field of the signals in the patch 210 to go in the vertical direction, while a portion 219-2 of the parasitic transmission line 218 may act as a horizontal coupler that enforces the electric field of the signals in the patch 210 to go in the horizontal direction. During operation of the patches 210, the parasitic transmission lines 218 may be electrically floating (e.g., not connected to any voltage/current source).

In some embodiments, the patch 210-1 may include an additional opening 220 (or multiple such openings) to improve the antenna return loss.

In the illustration of FIG. 2A, the two openings 212 within each patch 210 are shown to be merged (e.g., touching on one of their sides). However, in other embodiments, this does not have to be the case, as is illustrated in FIG. 2B. FIG. 2B illustrates an embodiment of the super-element 200 that is substantially the same as that shown in FIG. 2A except that the openings 212 within each patch 210 are not touching. Furthermore, while the openings 212 are shown in FIGS. 2A-2B as ring-shaped, in other embodiments of the super-element 200, the openings 212 may have any other shape that resemble rings and are possible or unavoidable to fabricate using processing techniques available. For example, in some embodiments of the super-element 200, the openings 212 may be resembling rings while being based on polygons. Together, a given antenna patch 210 with its' openings 212 and, if implemented, with the corresponding parasitic transmission line 218 and/or the additional opening 220 may be seen as an antenna element 230 of the super-element 200. The super-element 200 may then include four such antenna elements 230, each equally and progressively rotated in orientation with respect to its adjacent antenna elements 230 of that super-element 200. In order to not clutter the drawings, the approximate outline of one of the antenna elements 230 is shown in FIGS. 2A-2B with a dashed contour only for the antenna element 230-2, but four such antenna elements 230 are shown. The super-element 200 according to any of the embodiments described herein may be used to implement any of the antenna elements 112 of the antenna array 100 shown in FIG. 1.

Figure 3:
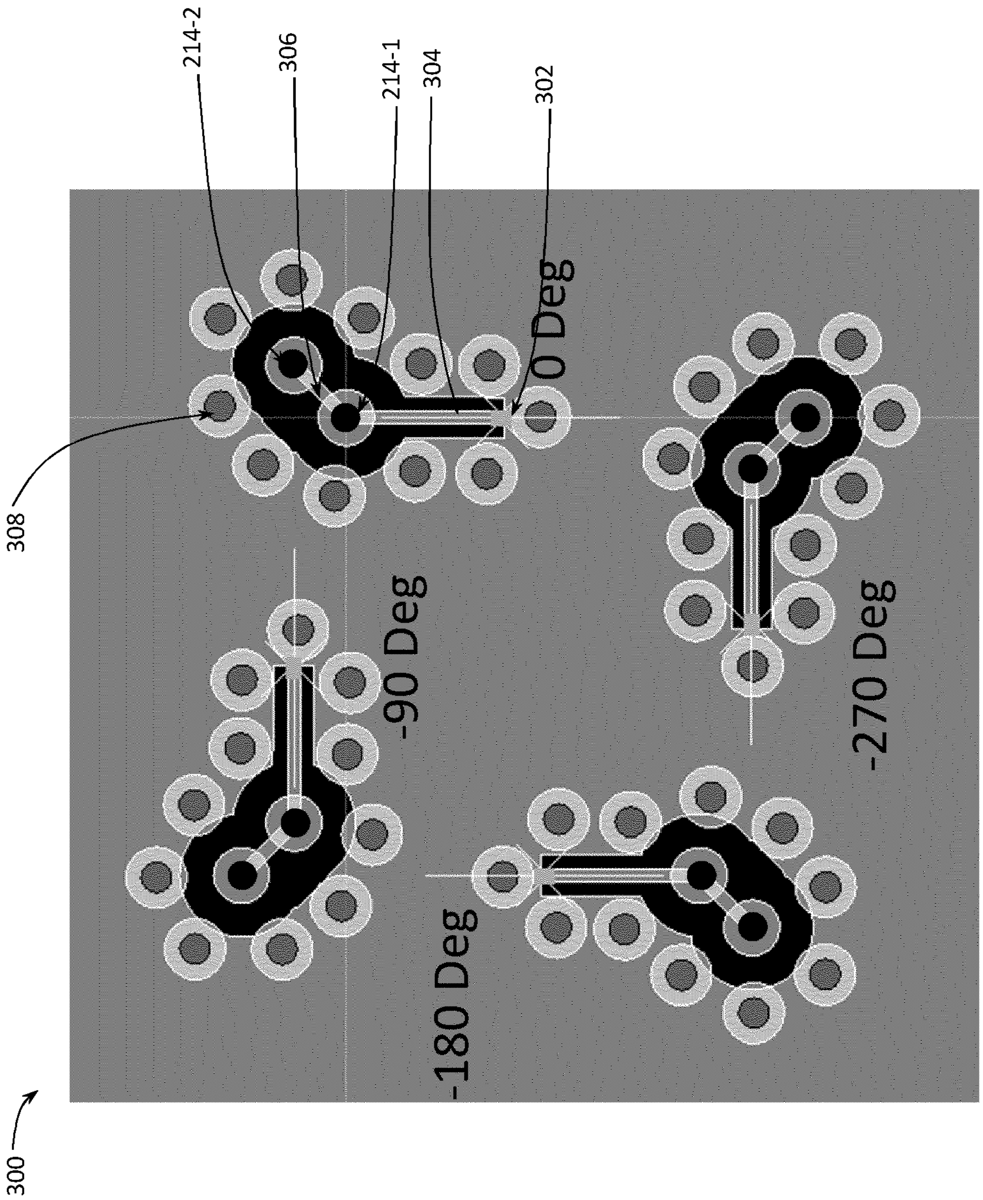
FIG. 3 provides a schematic illustration of an example layer for providing signals to the pairs of vias of different patches of an antenna super-element, according to some embodiments of the present disclosure.

FIG. 3 provides a schematic illustration of an example layer 300 for providing signals to the pairs of vias of different patches of an antenna super-element, e.g., of the super-element 200, shown in FIGS. 2A-2B, according to some embodiments of the present disclosure. The layer 300 may, e.g., be provided in a layer below the one shown in the illustrations of FIGS. 2A-2B (both FIG. 3 and FIGS. 2A-2B providing top-down views of different layers above the substrate/wafer/support structure). FIG. 3 illustrates the pairs of vias 214 for each of the 4 patches 210 of the super-element 200 of FIGS. 2A-2B, where different patches 210 are labeled in FIG. 3 by their phase offsets of 0, −90, −180, and −270 degrees (similar to how they were labeled in FIGS. 2A-2B). Also similar to FIGS. 2A-2B, only the patch 210-1 is described and labeled in FIG. 3, with the analogous descriptions being applicable to other patches 210 of the super-element 200.

As shown in FIG. 3, a feeding source 302 may be coupled to a transmission line 304 in the layer 300, where the transmission line 304 couples the feeding source 302 to the first via 214-1. The feeding source 302 may be referred to as an "excitation source" 302, configured to provide a wave port that feeds the transmission line 304 which delivers the RF signal to the feeding via 214-1 (e.g., to the bottom of the via 214-1 if the layer 300 is provided below the view of FIGS. 2A-2B). The excitation source 302 may, e.g., be the output of one of the beamformers 122, described above, configured to provide a signal (e.g., a linearly polarized signal) to be transmitted by the patch 210-1 of the super-element 200. The via 214-1 may be coupled to the via 214-2 by a transmission line 306, which may be a quarter-wave-length transmission line configured to apply a 90 degrees phase shift to the signal provided from the excitation source 302. In this way, the signal propagating in the via 214-2 may be 90 degrees phase-shifted with respect to the signal propagating in the via 214-1, thus realizing orthogonal (e.g., vertical and horizontal) linear polarizations in these two vias of the patch 210-1. A point, representing a region where a given excitation via 214 couples (e.g., contacts) the electrically conductive material of the layer 300, may be referred to as a "connection point" in the layer 300. The layer 300 may be below the layer of the antenna patches 210, in which case the layer 300 may be between a support structure over which the antenna patches 200 are provided (e.g., a PCB or a portion of a PCB) and the layer of the antenna patches 210.

FIG. 3 also illustrates a plurality of shielding vias 308 (only one of which is labeled), configured to shield the RF signals in the vias 214-1 and 214-2 of the patch 210-1 to minimize leakage. A plurality of shielding vias 308 is shown in FIG. 3, because such implementation is particularly suitable for PCB applications. Each shielding via 308 may be a via that includes an electrically conductive material coupled to the ground potential, which is electrically isolated from the electrically conductive material of the vias 214 and of the remainder of the patch 210-1. However, in other embodiments, a vertically oriented continuous layer of an electrically conductive material may be used instead, separated from the electrically conductive material of the antenna patch 210 and coupled to the ground potential.

The excitation source 310 is labeled in FIG. 3 for only the first patch 210-1, but other sources with same scheme and a progressive phase shift of 90 degrees may be used to feed analogous elements of the other patches 210-2 through 210-4 of the super-element 200. Thus, in the super-element 200, there are 90 degrees phase shifts between the different patches 210-1 through 210-4, and, additionally, another 90 degrees phase shift within each of the patches 210 to provide vertical and horizontal (orthogonal) polarizations for the signals in the vias 214-1 and 214-2.

While some of the descriptions are provided herein for feeding signals to the vias 214 (e.g., for the transmission path), analogous descriptions are applicable to signals travelling in the other direction (e.g., signals of the receipt path).

Figure 4:
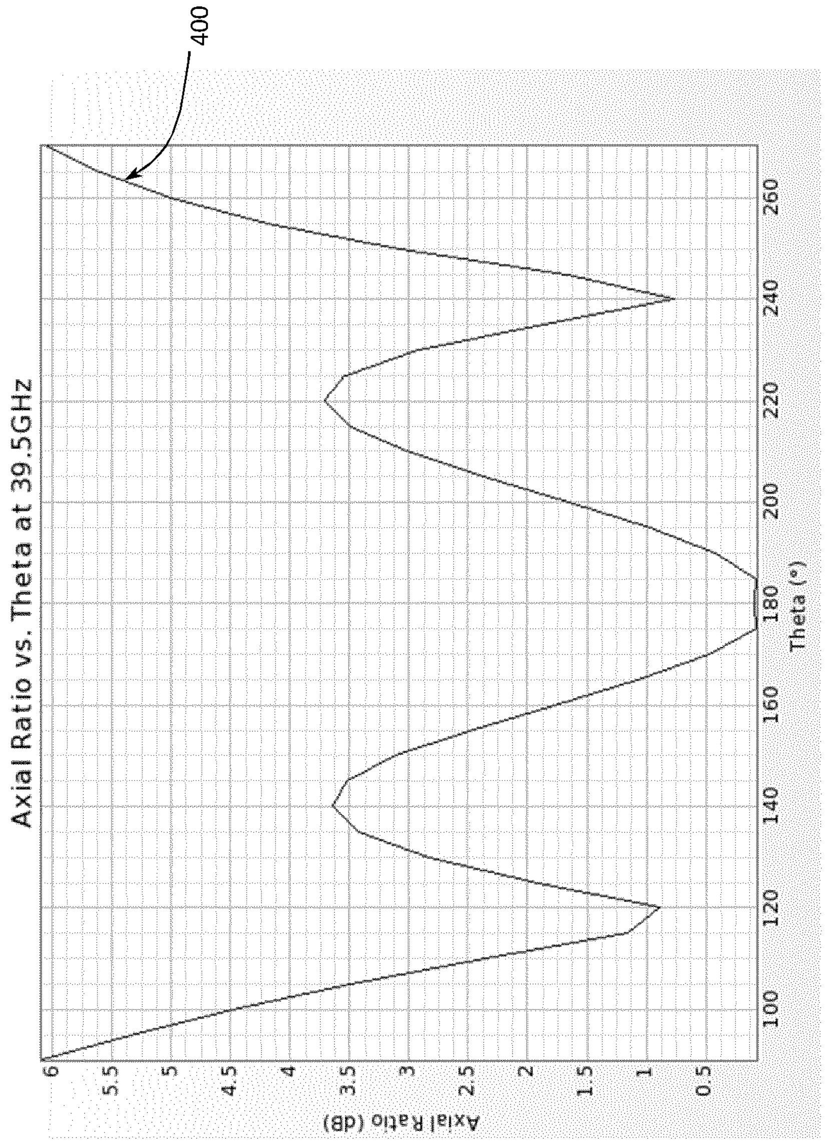
FIG. 4 illustrates a graph of an axial ratio as a function of angle, measured with respect to broadside direction, for an example antenna super-element that may be used to implement a circularly-polarized antenna with a wide scanning range, according to some embodiments of the present disclosure.

FIG. 4 illustrates a graph 400 of an axial ratio as a function of an angle, measured with respect to broadside direction, for an example antenna super-element, e.g., the super-element 200, that may be used to implement a circularly-polarized antenna with a wide scanning range, according to some embodiments of the present disclosure. In this example, Theta is the angle measured from broadside direction such as Theta being equal to 180 degrees indicates the broadside direction, so for Theta being equal to, e.g., 240 degrees it means that the main beam is 60 degrees away from the broadside direction. The graph 400 shows an axial ratio below 3.6 dB for an angle of about 75 degrees away from the broadside direction.

Figure 5:
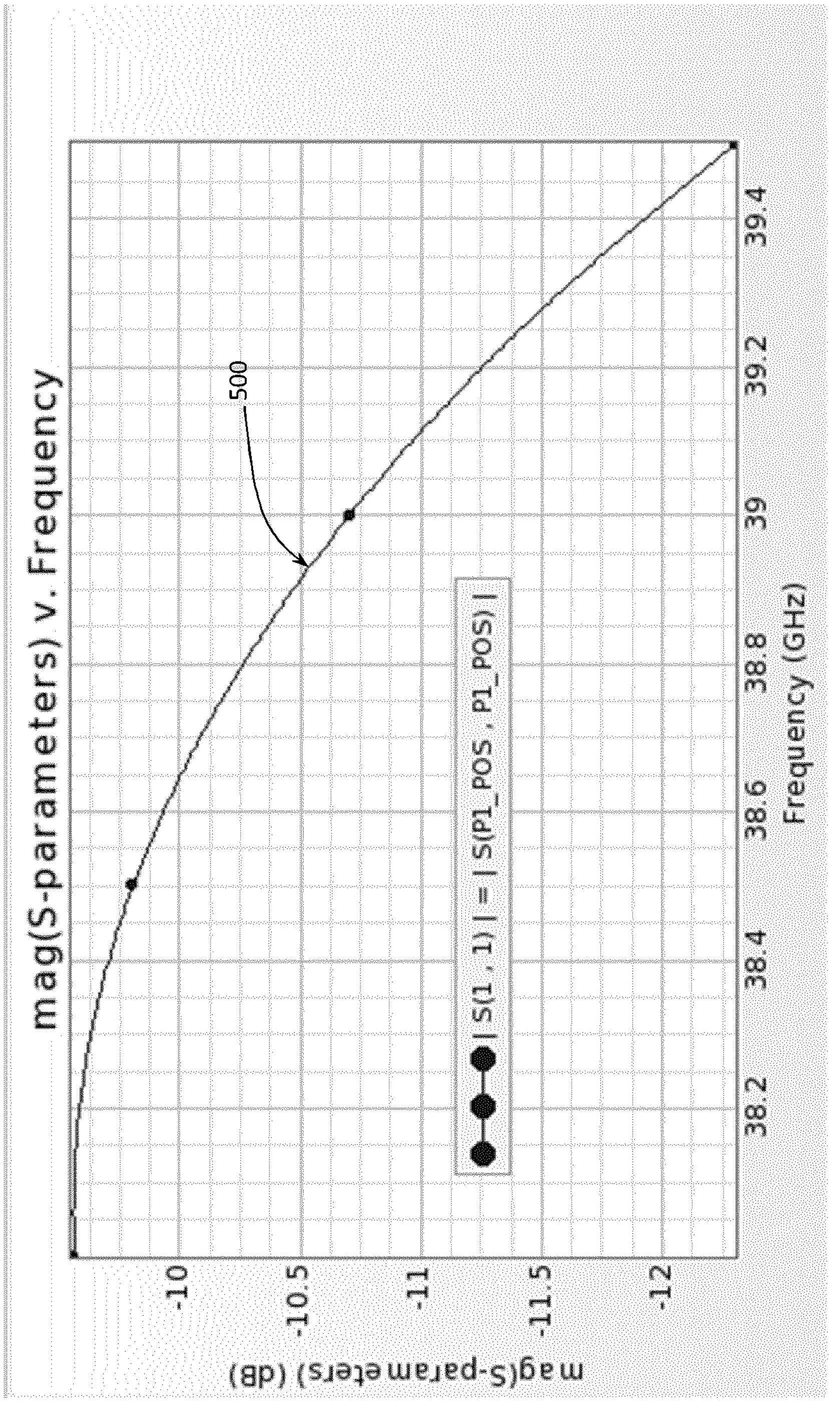
FIG. 5 illustrates a graph of a magnitude of a scattering parameter as a function of signal frequency for an example antenna super-element that may be used to implement a circularly-polarized antenna with a wide scanning range, according to some embodiments of the present disclosure.

FIG. 5 illustrates a graph 500 of a magnitude of a scattering parameter (s-parameter), which represents the return loss, as a function of signal frequency for an example antenna super-element, e.g., the super-element 200, that may be used to implement a circularly-polarized antenna with a wide scanning range, according to some embodiments of the present disclosure. The graph 500 illustrates that return loss below −9.5 dB may be achieved.

Figure 6:
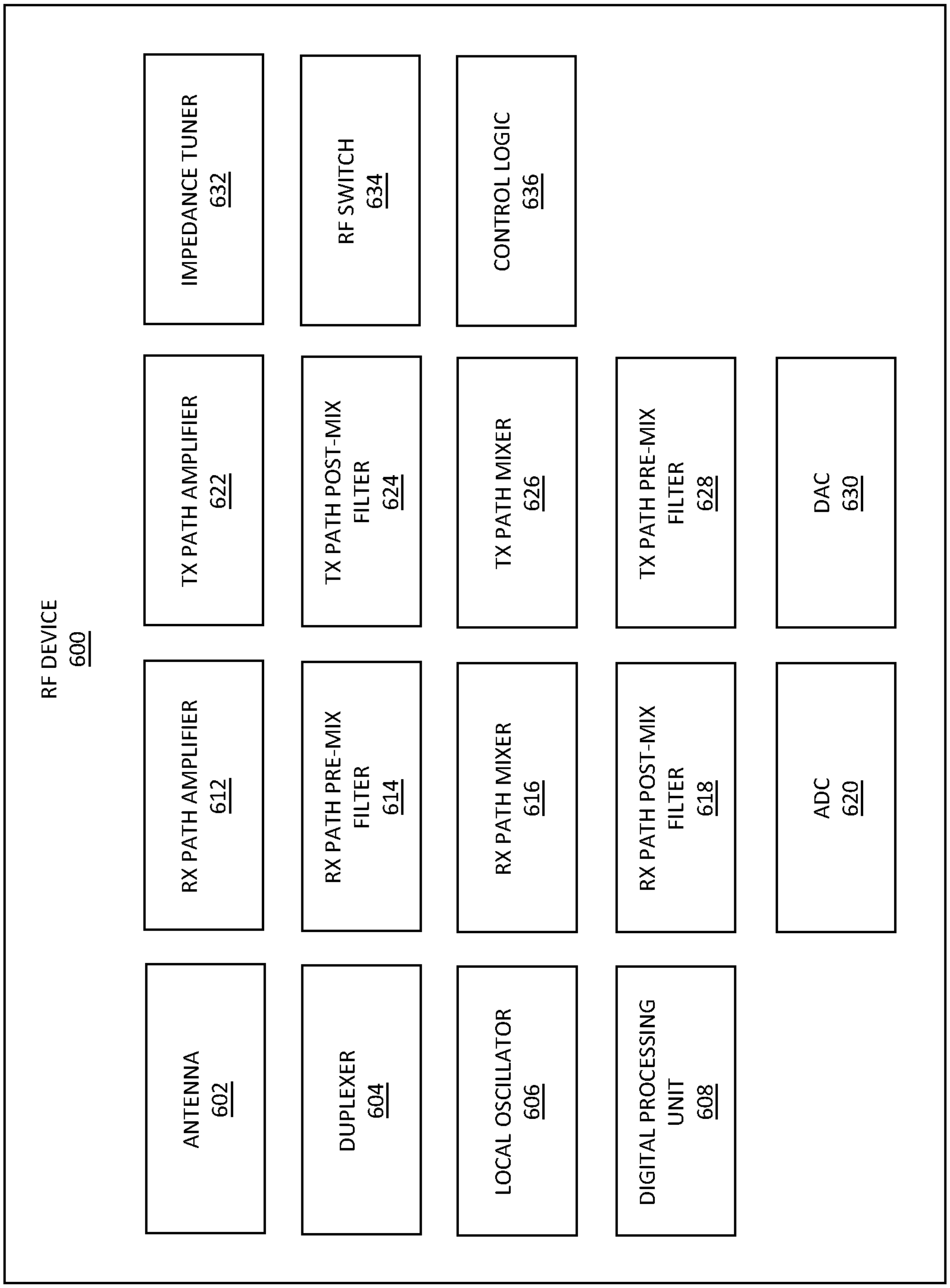
FIG. 6 provides a schematic block diagram illustrating an RF device in which circularly-polarized antennas with wide scanning ranges may be implemented, according to some embodiments of the present disclosure.

In some embodiments, phased array antennas with circularly-polarized antennas with wide scanning ranges as described herein may be included in various RF devices and systems used in wireless communications. For illustration purposes only, one example RF device that may include any of the phased array antennas with circularly-polarized antennas with wide scanning ranges described herein is shown in FIG. 6 and described below. However, in general, phased array antennas with circularly-polarized antennas with wide scanning ranges as described herein may be included in other RF devices and systems, all of which being within the scope of the present disclosure.

FIG. 6 is a block diagram of an example RF device 600, e.g., an RF transceiver, in which a phased array antenna with circularly-polarized antennas with wide scanning ranges may be implemented, according to some embodiments of the present disclosure.

In general, the RF device 600 may be any device or system that may support wireless transmission and/or reception of signals in the form of electromagnetic waves in the RF range of approximately 3 kHz to approximately 300 GHz. In some embodiments, the RF device 600 may be used for wireless communications, e.g., in a base station (BS) or a user equipment (UE) device of any suitable cellular wireless communications technology, such as GSM, WCDMA, or LTE. In a further example, the RF device 600 may be used as, or in, e.g., a BS or a UE device of a mm-wave wireless technology such as 5G wireless (e.g., high-frequency/short-wavelength spectrum, e.g., with frequencies in the range between about 20 and 60 GHz, corresponding to wavelengths in the range between about 5 and 15 millimeters). In yet another example, the RF device 600 may be used for wireless communications using Wi-Fi technology (e.g., a frequency band of 2.4 GHz, corresponding to a wavelength of about 7 cm, or a frequency band of 5.8 GHz, spectrum, corresponding to a wavelength of about 5 cm), e.g., in a Wi-Fi-enabled device such as a desktop, a laptop, a video game console, a smart phone, a tablet, a smart TV, a digital audio player, a car, a printer, etc. In some implementations, a Wi-Fi-enabled device may, e.g., be a node in a smart system configured to communicate data with other nodes, e.g., a smart sensor. Still in another example, the RF device 600 may be used for wireless communications using Bluetooth technology (e.g., a frequency band from about 2.4 to about 2.485 GHz, corresponding to a wavelength of about 7 cm). In other embodiments, the RF device 600 may be used for transmitting and/or receiving RF signals for purposes other than communication, e.g., in an automotive radar system, or in medical applications such as MRI.

In various embodiments, the RF device 600 may be included in frequency-domain duplex (FDD) or time-domain duplex (TDD) variants of frequency allocations that may be used in a cellular network. In an FDD system, the uplink (e.g., RF signals transmitted from the UE devices to a BS) and the downlink (e.g., RF signals transmitted from the BS to the US devices) may use separate frequency bands at the same time. In a TDD system, the uplink and the downlink may use the same frequencies but at different times.

Several components are illustrated in FIG. 6 as included in the RF device 600, but any one or more of these components may be omitted or duplicated, as suitable for the application. For example, in some embodiments, the RF device 600 may be an RF device supporting both of wireless transmission and reception of RF signals (e.g., an RF transceiver), in which case it may include both the components of what is referred to herein as a transmit (TX) path and the components of what is referred to herein as a receive (RX) path. However, in other embodiments, the RF device 600 may be an RF device supporting only wireless reception (e.g., an RF receiver), in which case it may include the components of the RX path, but not the components of the TX path; or the RF device 600 may be an RF device supporting only wireless transmission (e.g., an RF transmitter), in which case it may include the components of the TX path, but not the components of the RX path.

In some embodiments, some or all the components included in the RF device 600 may be attached to one or more motherboards. In some embodiments, some or all these components are fabricated on a single die, e.g., on a single system on chip (SOC) die.

Additionally, in various embodiments, the RF device 600 may not include one or more of the components illustrated in FIG. 6, but the RF device 600 may include interface circuitry for coupling to the one or more components. For example, the RF device 600 may not include a digital processing unit 608 but may include interface circuitry (e.g., connectors and supporting circuitry) to which the digital processing unit 608 may be coupled. In another example, the RF device 600 may not include a LO 606, but may include interface circuitry (e.g., connectors and supporting circuitry) to which the LO 606 may be coupled.

As shown in FIG. 6, the RF device 600 may include an antenna 602, a duplexer 604 (e.g., if the RF device 600 is an FDD RF device; otherwise, the duplexer 604 may be omitted), an LO 606, a digital processing unit 608. As also shown in FIG. 6, the RF device 600 may include an RX path that may include an RX path amplifier 612, an RX path pre-mix filter 614, a RX path mixer 616, an RX path post-mix filter 618, and an ADC 620. As further shown in FIG. 6, the RF device 600 may include a TX path that may include a TX path amplifier 622, a TX path post-mix filter 624, a TX path mixer 626, a TX path pre-mix filter 628, and a DAC 630. Still further, the RF device 600 may further include an impedance tuner 632, an RF switch 634, and control logic 636. In various embodiments, the RF device 600 may include multiple instances of any of the components shown in FIG. 6. In some embodiments, the RX path amplifier 612, the TX path amplifier 622, the duplexer 604, and the RF switch 634 may be considered to form, or be a part of, an RF front-end (FE) of the RF device 600. In some embodiments, the RX path amplifier 612, the TX path amplifier 622, the duplexer 604, and the RF switch 634 may be considered to form, or be a part of, an RF FE of the RF device 600. In some embodiments, the RX path mixer 616 and the TX path mixer 626 (possibly with their associated pre-mix and post-mix filters shown in FIG. 6) may be considered to form, or be a part of, an RF transceiver of the RF device 600 (or of an RF receiver or an RF transmitter if only RX path or TX path components, respectively, are included in the RF device 600). In some embodiments, the RF device 600 may further include one or more control logic elements/circuits, shown in FIG. 6 as control logic 636, e.g., an RF FE control interface. In some embodiments, the control logic 636 may be used to perform functions such as enhance control of complex RF system environment, support implementation of envelope tracking techniques, or reduce dissipated power within the RF device 600. In some embodiments, the control logic 636 may control operation of circularly-polarized antennas with wide scanning ranges as described herein.

The antenna 602 may be configured to wirelessly transmit and/or receive RF signals in accordance with any wireless standards or protocols, e.g., Wi-Fi, LTE, or GSM, as well as any other wireless protocols that are designated as 3G, 4G, 5G, and beyond. If the RF device 600 is an FDD transceiver, the antenna 602 may be configured for concurrent reception and transmission of communication signals in separate, e.g., non-overlapping and non-continuous, bands of frequencies, e.g., in bands having a separation of, e.g., 20 MHz from one another. If the RF device 600 is a TDD transceiver, the antenna 602 may be configured for sequential reception and transmission of communication signals in bands of frequencies that may be the same or overlapping for TX and RX paths. In some embodiments, the RF device 600 may be a multi-band RF device, in which case the antenna 602 may be configured for concurrent reception of signals having multiple RF components in separate frequency bands and/or configured for concurrent transmission of signals having multiple RF components in separate frequency bands. In such embodiments, the antenna 602 may be a single wide-band antenna or a plurality of band-specific antennas (e.g., a plurality of antennas each configured to receive and/or transmit signals in a specific band of frequencies). In various embodiments, the antenna 602 may be an antenna array with circularly-polarized antennas with wide scanning ranges as described herein. In some embodiments, the RF device 600 may include more than one antenna 602 to implement antenna diversity. In some such embodiments, the RF switch 634 may be deployed to switch between different antennas.

An output of the antenna 602 may be coupled to the input of the duplexer 604. The duplexer 604 may be any suitable component configured for filtering multiple signals to allow for bidirectional communication over a single path between the duplexer 604 and the antenna 602. The duplexer 604 may be configured for providing RX signals to the RX path of the RF device 600 and for receiving TX signals from the TX path of the RF device 600.

The RF device 600 may include one or more LOs 606, configured to provide LO signals that may be used for downconversion of the RF signals received by the antenna 602 and/or upconversion of the signals to be transmitted by the antenna 602.

The RF device 600 may include the digital processing unit 608, which may include one or more processing devices. The digital processing unit 608 may be configured to perform various functions related to digital processing of the RX and/or TX signals. Examples of such functions include, but are not limited to, decimation/downsampling, error correction, digital downconversion or upconversion, DC offset cancellation, automatic gain control, etc. Although not shown in FIG. 6, in some embodiments, the RF device 600 may further include a memory device, configured to cooperate with the digital processing unit 608.

Turning to the details of the RX path that may be included in the RF device 600, the RX path amplifier 612 may include a LNA. An input of the RX path amplifier 612 may be coupled to an antenna port (not shown) of the antenna 602, e.g., via the duplexer 604. The RX path amplifier 612 may amplify the RF signals received by the antenna 602.

An output of the RX path amplifier 612 may be coupled to an input of the RX path pre-mix filter 614, which may be a harmonic or band-pass (e.g., low-pass) filter, configured to filter received RF signals that have been amplified by the RX path amplifier 612.

An output of the RX path pre-mix filter 614 may be coupled to an input of the RX path mixer 616, also referred to as a downconverter. The RX path mixer 616 may include two inputs and one output. A first input may be configured to receive the RX signals, which may be current signals, indicative of the signals received by the antenna 602 (e.g., the first input may receive the output of the RX path pre-mix filter 614). A second input may be configured to receive LO signals from one of the LOs 606. The RX path mixer 616 may then mix the signals received at its two inputs to generate a downconverted RX signal, provided at an output of the RX path mixer 616. As used herein, downconversion refers to a process of mixing a received RF signal with an LO signal to generate a signal of a lower frequency. In particular, the TX path mixer (e.g., downconverter) 616 may be configured to generate the sum and/or the difference frequency at the output port when two input frequencies are provided at the two input ports. In some embodiments, the RF device 600 may implement a direct-conversion receiver (DCR), also known as homodyne, synchrodyne, or zero-IF receiver, in which case the RX path mixer 616 may be configured to demodulate the incoming radio signals using LO signals whose frequency is identical to, or very close to the carrier frequency of the radio signal. In other embodiments, the RF device 600 may make use of downconversion to the IF. IFs may be used in superheterodyne radio receivers, in which a received RF signal is shifted to an IF before the final detection of the information in the received signal is done. In some embodiments, the RX path mixer 616 may include several stages of IF conversion.

Although a single RX path mixer 616 is shown in the RX path of FIG. 6, in some embodiments, the RX path mixer 616 may be implemented as a quadrature downconverter, in which case it would include a first RX path mixer and a second RX path mixer. The first RX path mixer may be configured for performing downconversion to generate an in-phase (I) downconverted RX signal by mixing the RX signal received by the antenna 602 and an in-phase component of the LO signal provided by the LO 606. The second RX path mixer may be configured for performing downconversion to generate a quadrature (Q) downconverted RX signal by mixing the RX signal received by the antenna 602 and a quadrature component of the LO signal provided by the local oscillator 606 (the quadrature component is a component that is offset, in phase, from the in-phase component of the local oscillator signal by 90 degrees). The output of the first RX path mixer may be provided to a I-signal path, and the output of the second RX path mixer may be provided to a Q-signal path, which may be substantially 90 degrees out of phase with the I-signal path.

The output of the RX path mixer 616 may, optionally, be coupled to the RX path post-mix filter 618, which may be low-pass filters. In case the RX path mixer 616 is a quadrature mixer that implements the first and second mixers as described above, the IQ components provided at the outputs of the first and second mixers respectively may be coupled to respective individual first and second RX path post-mix filters included in the filter 618.

The ADC 620 may be configured to convert the mixed RX signals from the RX path mixer 616 from analog to digital domain. The ADC 620 may be a quadrature ADC that, like the RX path quadrature mixer 616, may include two ADCs, configured to digitize the downconverted RX path signals separated in IQ components. The output of the ADC 620 may be provided to the digital processing unit 608, configured to perform various functions related to digital processing of the RX signals so that information encoded in the RX signals can be extracted.

Turning to the details of the TX path that may be included in the RF device 600, the digital signal to later be transmitted (TX signal) by the antenna 602 may be provided, from the digital processing unit 608, to the DAC 630. Like the ADC 620, the DAC 630 may include two DACs, configured to convert, respectively, digital I- and Q-path TX signal components to analog form.

Optionally, the output of the DAC 630 may be coupled to the TX path pre-mix filter 628, which may be a band-pass (e.g., low-pass) filter (or a pair of band-pass, e.g., low-pass, filters, in case of quadrature processing) configured to filter out, from the analog TX signals output by the DAC 630, the signal components outside of the desired band. The digital TX signals may then be provided to the TX path mixer 626, which may also be referred to as an upconverter. Like the RX path mixer 616, the TX path mixer 626 may include a pair of TX path mixers, for IQ component mixing. Like the first and second RX path mixers that may be included in the RX path, each of the TX path mixers of the TX path mixer 626 may include two inputs and one output. A first input may receive the TX signal components, converted to the analog form by the respective DAC 630, which are to be upconverted to generate RF signals to be transmitted. The first TX path mixer may generate an in-phase (I) upconverted signal by mixing the TX signal component converted to analog form by the DAC 630 with the in-phase component of the TX path LO signal provided from the LO 606 (in various embodiments, the LO 606 may include a plurality of different LOs or be configured to provide different LO frequencies for the mixer 616 in the RX path and the mixer 626 in the TX path). The second TX path mixer may generate a quadrature phase (Q) upconverted signal by mixing the TX signal component converted to analog form by the DAC 630 with the quadrature component of the TX path LO signal. The output of the second TX path mixer may be added to the output of the first TX path mixer to create a real RF signal. A second input of each of the TX path mixers may be coupled the LO 606.

Optionally, the RF device 600 may include the TX path post-mix filter 624, configured to filter the output of the TX path mixer 626.

The TX path amplifier 622 may include an array of power amplifiers.

In various embodiments, any of the RX path pre-mix filter 614, the RX path post-mix filter 618, the TX post-mix filter 624, and the TX pre-mix filter 628 may be implemented as RF filters. In some embodiments, an RF filter may be implemented as a plurality of RF filters, or a filter bank. A filter bank may include a plurality of RF filters that may be coupled to a switch, e. g., the RF switch 634, configured to selectively switch any one of the plurality of RF filters on and off (e.g., activate any one of the plurality of RF filters), in order to achieve desired filtering characteristics of the filter bank (e.g., in order to program the filter bank). For example, such a filter bank may be used to switch between different RF frequency ranges when the RF device 600 is, or is included in, a BS or in a UE device. In another example, such a filter bank may be programmable to suppress TX leakage on the different duplex distances.

The impedance tuner 632 may include any suitable circuitry, configured to match the input and output impedances of the different RF circuitries to minimize signal losses in the RF device 600. For example, the impedance tuner 632 may include an antenna impedance tuner. Being able to tune the impedance of the antenna 602 may be particularly advantageous because antenna's impedance is a function of the environment that the RF device 600 is in, e.g., antenna's impedance changes depending on, e.g., if the antenna is held in a hand, placed on a car roof, etc.

As described above, the RF switch 634 may be a device configured to route high-frequency signals through transmission paths, e.g., in order to selectively switch between a plurality of instances of any one of the components shown in FIG. 6, e.g., to achieve desired behavior and characteristics of the RF device 600. For example, in some embodiments, an RF switch may be used to switch between different antennas 602. In other embodiments, an RF switch may be used to switch between a plurality of RF filters (e.g., by selectively switching RF filters on and off) of the RF device 600. Typically, an RF system would include a plurality of such RF switches.

The RF device 600 provides a simplified version and, in further embodiments, other components not specifically shown in FIG. 6 may be included. For example, the RX path of the RF device 600 may include a current-to-voltage amplifier between the RX path mixer 616 and the ADC 620, which may be configured to amplify and convert the down-converted signals to voltage signals. In another example, the RX path of the RF device 600 may include a balun transformer for generating balanced signals. In yet another example, the RF device 600 may further include a clock generator, which may, e.g., include a suitable phased-lock LO signals to be used in the RX path or the TX path.

Figure 7:
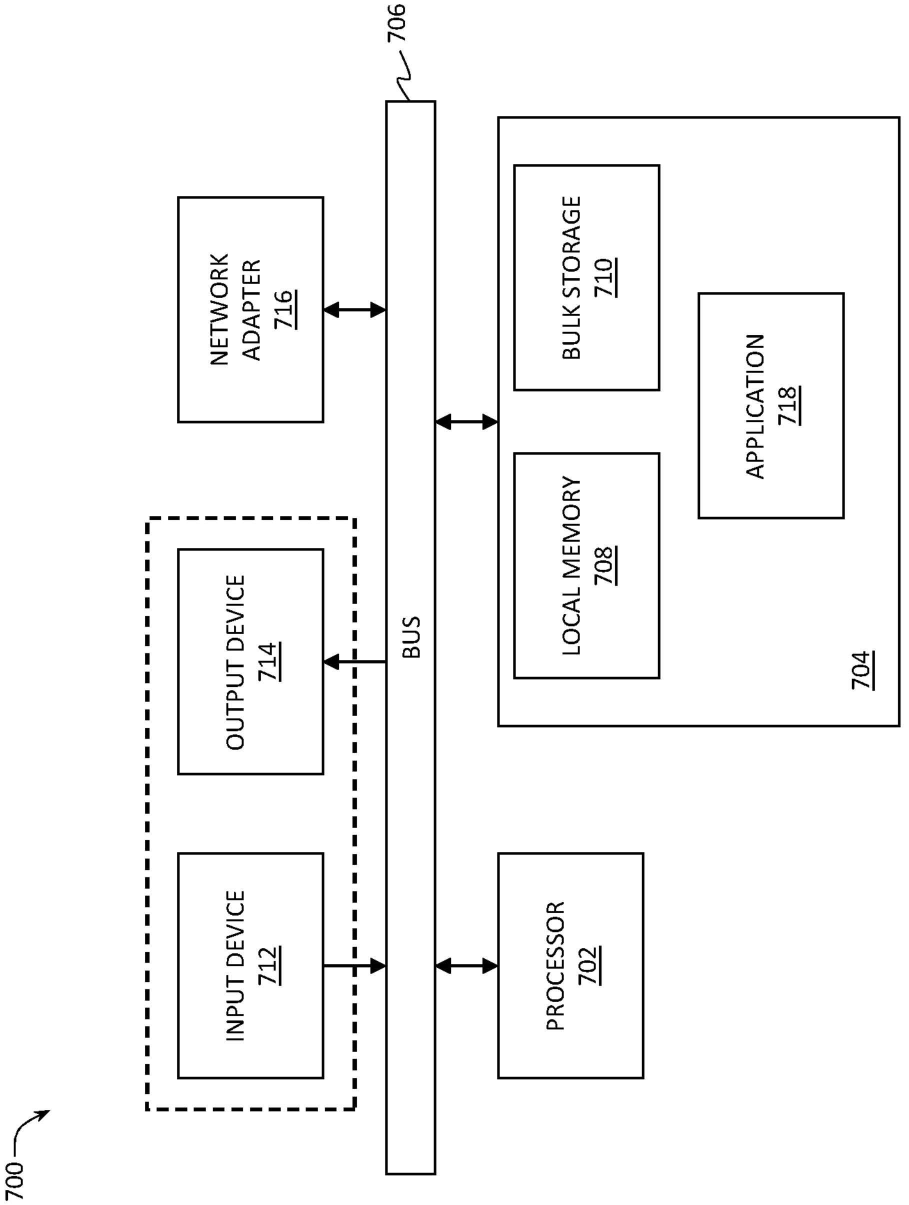
FIG. 7 provides a block diagram illustrating an example data processing system that may be configured to implement, or control, at least portions of operating circularly-polarized antennas with wide scanning ranges, according to some embodiments of the present disclosure.

FIG. 7 provides a block diagram illustrating an example data processing system 700 that may be configured to implement, or control implementations of, at least portions of systems and methods for operating circularly-polarized antennas with wide scanning ranges as described herein. For example, the data processing system 700 may include, or be included in, a control processor of a phase antenna array, e.g., the data processing system 700 may include, or be included in the control logic 636, shown in FIG. 6, according to some embodiments of the present disclosure.

As shown in FIG. 7, the data processing system 700 may include at least one processor 702, e.g., a hardware processor 702, coupled to memory elements 704 through a system bus 706. As such, the data processing system may store program code within memory elements 704. Further, the processor 702 may execute the program code accessed from the memory elements 704 via a system bus 706. In one aspect, the data processing system may be implemented as a computer that is suitable for storing and/or executing program code. It should be appreciated, however, that the data processing system 700 may be implemented in the form of any system including a processor and a memory that is capable of performing the functions described within this disclosure, in particular functions related to operating circularly-polarized antennas with wide scanning ranges as described herein.

In some embodiments, the processor 702 can execute software or an algorithm to perform the activities as discussed in this specification, in particular activities related to operating circularly-polarized antennas with wide scanning ranges as described herein. The processor 702 may include any combination of hardware, software, or firmware providing programmable logic, including by way of non-limiting example a microprocessor, a digital signal processor (DSP), a field-programmable gate array (FPGA), a programmable logic array (PLA), an application specific integrated circuit (ASIC), or a virtual machine processor. The processor 702 may be communicatively coupled to the memory element 704, for example in a direct-memory access (DMA) configuration, so that the processor 702 may read from or write to the memory elements 704.

In general, the memory elements 704 may include any suitable volatile or non-volatile memory technology, including double data rate (DDR) random access memory (RAM), synchronous RAM (SRAM), dynamic RAM (DRAM), flash, read-only memory (ROM), optical media, virtual memory regions, magnetic or tape memory, or any other suitable technology. Unless specified otherwise, any of the memory elements discussed herein should be construed as being encompassed within the broad term "memory." The information being measured, processed, tracked or sent to or from any of the components of the data processing system 700 could be provided in any database, register, control list, cache, or storage structure, all of which can be referenced at any suitable timeframe. Any such storage options may be included within the broad term "memory" as used herein. Similarly, any of the potential processing elements, modules, and machines described herein should be construed as being encompassed within the broad term "processor." Each of the elements shown in the present figures, e.g., any of the circuits/components shown in FIGS. 1-3 and FIG. 6, can also include suitable interfaces for receiving, transmitting, and/or otherwise communicating data or information in a network environment so that they can communicate with, e.g., the data processing system 700 of another one of these elements.

In certain example implementations, mechanisms for operating circularly-polarized antennas with wide scanning ranges as described herein may be implemented by logic encoded in one or more tangible media, which may be inclusive of non-transitory media, e.g., embedded logic provided in an ASIC, in DSP instructions, software (potentially inclusive of object code and source code) to be executed by a processor, or other similar machine, etc. In some of these instances, memory elements, such as the memory elements 704 shown in FIG. 7, can store data or information used for the operations described herein. This includes the memory elements being able to store software, logic, code, or processor instructions that are executed to carry out the activities described herein. A processor can execute any type of instructions associated with the data or information to achieve the operations detailed herein. In one example, the processors, such as the processor 702 shown in FIG. 7, could transform an element or an article (e.g., data) from one state or thing to another state or thing. In another example, the activities outlined herein may be implemented with fixed logic or programmable logic (e.g., software/computer instructions executed by a processor) and the elements identified herein could be some type of a programmable processor, programmable digital logic (e.g., an FPGA, a DSP, an erasable programmable read-only memory (EPROM), an electrically erasable programmable read-only memory (EEPROM)) or an ASIC that includes digital logic, software, code, electronic instructions, or any suitable combination thereof.

The memory elements 704 may include one or more physical memory devices such as, for example, local memory 708 and one or more bulk storage devices 710. The local memory may refer to RAM or other non-persistent memory device(s) generally used during actual execution of the program code. A bulk storage device may be implemented as a hard drive or other persistent data storage device. The processing system 700 may also include one or more cache memories (not shown) that provide temporary storage of at least some program code in order to reduce the number of times program code must be retrieved from the bulk storage device 710 during execution.

As shown in FIG. 7, the memory elements 704 may store an application 718. In various embodiments, the application 718 may be stored in the local memory 708, the one or more bulk storage devices 710, or apart from the local memory and the bulk storage devices. It should be appreciated that the data processing system 700 may further execute an operating system (not shown in FIG. 7) that can facilitate execution of the application 718. The application 718, being implemented in the form of executable program code, can be executed by the data processing system 700, e.g., by the processor 702. Responsive to executing the application, the data processing system 700 may be configured to perform one or more operations or method steps described herein.

Input/output (I/O) devices depicted as an input device 712 and an output device 714, optionally, can be coupled to the data processing system. Examples of input devices may include, but are not limited to, a keyboard, a pointing device such as a mouse, or the like. Examples of output devices may include, but are not limited to, a monitor or a display, speakers, or the like. In some embodiments, the output device 714 may be any type of screen display, such as plasma display, liquid crystal display (LCD), organic light emitting diode (OLED) display, electroluminescent (EL) display, or any other indicator, such as a dial, barometer, or LEDs. In some implementations, the system may include a driver (not shown) for the output device 714. Input and/or output devices 712, 714 may be coupled to the data processing system either directly or through intervening I/O controllers.

In an embodiment, the input and the output devices may be implemented as a combined input/output device (illustrated in FIG. 7 with a dashed line surrounding the input device 712 and the output device 714). An example of such a combined device is a touch sensitive display, also sometimes referred to as a "touch screen display" or simply "touch screen". In such an embodiment, input to the device may be provided by a movement of a physical object, such as a stylus or a finger of a user, on or near the touch screen display.

A network adapter 716 may also, optionally, be coupled to the data processing system to enable it to become coupled to other systems, computer systems, remote network devices, and/or remote storage devices through intervening private or public networks. The network adapter may comprise a data receiver for receiving data that is transmitted by said systems, devices and/or networks to the data processing system 700, and a data transmitter for transmitting data from the data processing system 700 to said systems, devices and/or networks. Modems, cable modems, and Ethernet cards are examples of different types of network adapter that may be used with the data processing system 700.

While embodiments of the present disclosure were described above with references to exemplary implementations as shown in FIGS. 1-7, a person skilled in the art will realize that the various teachings described above are applicable to a large variety of other implementations. For example, descriptions provided herein are applicable not only to 5G systems, which provide one example of wireless communication systems, but also to other wireless communication systems such as, but not limited to, Wi-Fi technology or Bluetooth technology. In yet another example, descriptions provided herein are applicable not only to wireless communication systems, but also to any other systems where antenna arrays may be used, such as radar systems.

In certain contexts, the features discussed herein can be applicable to automotive systems, medical systems, scientific instrumentation, wireless and wired communications, radio, radar, and digital-processing-based systems.

In the discussions of the embodiments above, components of a system, such as phase shifters, vias, and/or other components can readily be replaced, substituted, or otherwise modified in order to accommodate particular circuitry needs. Moreover, it should be noted that the use of complementary electronic devices, hardware, software, etc., offer an equally viable option for implementing the teachings of the present disclosure related to extending the scanning range for circularly-polarized antennas as described herein.

In one example embodiment, any number of electrical circuits of the present drawings may be implemented on a board of an associated electronic device. The board can be a general circuit board that can hold various components of the internal electronic system of the electronic device and, further, provide connectors for other peripherals. More specifically, the board can provide the electrical connections by which the other components of the system can communicate electrically. Any suitable processors (inclusive of DSPs, microprocessors, supporting chipsets, etc.), computer-readable non-transitory memory elements, etc. can be suitably coupled to the board based on particular configuration needs, processing demands, computer designs, etc. Other components such as external storage, additional sensors, controllers for audio/video display, and peripheral devices may be attached to the board as plug-in cards, via cables, or integrated into the board itself. In various embodiments, the functionalities described herein may be implemented in emulation form as software or firmware running within one or more configurable (e.g., programmable) elements arranged in a structure that supports these functions. The software or firmware providing the emulation may be provided on non-transitory computer-readable storage medium comprising instructions to allow a processor to carry out those functionalities.

In another example embodiment, the electrical circuits of the present drawings may be implemented as stand-alone modules (e.g., a device with associated components and circuitry configured to perform a specific application or function) or implemented as plug-in modules into application specific hardware of electronic devices. Note that particular embodiments of the present disclosure may be readily included in a SOC package, either in part, or in whole. An SOC represents an integrated circuit (IC) that integrates components of a computer or other electronic system into a single chip. It may contain digital, analog, mixed-signal, and often RF functions: all of which may be provided on a single chip substrate. Other embodiments may include a multi-chip-module (MCM), with a plurality of separate ICs located within a single electronic package and configured to interact closely with each other through the electronic package.

It is also imperative to note that all of the specifications, dimensions, and relationships outlined herein (e.g., the number of components shown in the systems of FIGS. 1-7) have only been offered for purposes of example and teaching only. Such information may be varied considerably without departing from the spirit of the present disclosure. It should be appreciated that the system can be consolidated in any suitable manner. Along similar design alternatives, any of the illustrated circuits, components, modules, and elements of the present drawings may be combined in various possible configurations, all of which are clearly within the broad scope of this specification. In the foregoing description, example embodiments have been described with reference to particular component arrangements. Various modifications and changes may be made to such embodiments without departing from the scope of the present disclosure. The description and drawings are, accordingly, to be regarded in an illustrative rather than in a restrictive sense.

Some select examples of embodiments of the present disclosure are summarized below.

Example 1 provides an antenna assembly that includes a support structure (e.g., a PCB, or a portion of the PCB); an antenna patch (e.g., an antenna patch 210-1) of an electrically conductive material in a first layer over the support structure (e.g., the layer shown in the view of FIG. 2); a first via (e.g., a via 214-1 of the antenna patch 210-1), extending between (and being electrically coupled to, e.g., being in contact with) a first via connection point in a second layer over the support structure (e.g., the layer shown in the view of FIG. 3) and a first via connection point in the antenna patch (i.e., a first via connection point in the first layer over the support structure); a second via (e.g., a via 214-2 of the antenna patch 210-1), extending between (and being electrically coupled to, e.g., being in contact with) a second via connection point in the second layer over the support structure and a second via connection point in the antenna patch (i.e., a second via connection point in the first layer over the support structure), where the second via connection point in the antenna patch is different from the first via connection point in the antenna patch, and the second via connection point in the second layer is different from the first via connection point in the second layer; a first opening in the electrically conductive material of the antenna patch, partially enclosing the first via connection point in the antenna patch so that a first portion of the electrically conductive material of the antenna patch is between a portion of the electrically conductive material of the antenna patch partially within the first opening and a portion of the electrically conductive material of the antenna patch outside the first opening; and a second opening in the electrically conductive material of the antenna patch, partially enclosing the second via connection point in the antenna patch so that a second portion of the electrically conductive material of the antenna patch is between a portion of the electrically conductive material of the antenna patch partially within the second opening and a portion of the electrically conductive material of the antenna patch outside the second opening, where the first portion of the electrically conductive material of the antenna patch is substantially perpendicular to the second portion of the electrically conductive material of the antenna patch.

Example 2 provides the antenna assembly according to example 1, where the first opening is a continuous opening that encloses the first via connection point in the antenna patch except for the first portion of the electrically conductive material of the antenna patch. Similarly, the second opening may be a continuous opening that encloses the second via connection point in the antenna patch except for the second portion of the electrically conductive material of the antenna patch.

Example 3 provides the antenna assembly according to example 2, where the first opening is a ring-shaped opening. Similarly, the second opening may be a ring-shaped opening.

Example 4 provides the antenna assembly according to any one of the preceding examples, where a portion of the first opening is in contact with a portion of the second opening.

Example 5 provides the antenna assembly according to any one of the preceding examples, where the first via connection point in the antenna patch is substantially at a center of the first opening. Similarly, the second via connection point in the antenna patch may be substantially at a center of the second opening.

Example 6 provides the antenna assembly according to any one of the preceding examples, further including a transmission line (e.g., a transmission line 308) that extends between (and is electrically coupled to, e.g., is in contact with) the first via connection point in the second layer and the second via connection point in the second layer.

Example 7 provides the antenna assembly according to example 6, where the transmission line is a quarter-wavelength transmission line.

Example 8 provides the antenna assembly according to examples 6 or 7, further including a signal interconnect (e.g., a transmission line 304) coupled to either the first via connection point in the second layer or the second via connection point in the second layer.

Example 9 provides the antenna assembly according to any one of examples 6-8, where the transmission line is in the second layer.

Example 10 provides the antenna assembly according to any one of the preceding examples, further including a transmission line (e.g., a transmission line 218) in the first layer over the support structure, where the transmission line is at a distance to, and partially encloses, the antenna patch.

Example 11 provides the antenna assembly according to example 10, where the transmission line is floating during operation of the antenna assembly.

Example 12 provides the antenna assembly according to examples 10 or 11, where the transmission line includes a first portion (e.g., a portion 219-1) that is substantially perpendicular to a line between the first via connection point in the antenna patch and the first portion of the electrically conductive material of the antenna patch, and a second portion (e.g., a portion 219-2) that is substantially perpendicular to a line between the second via connection point in the antenna patch and the second portion of the electrically conductive material of the antenna patch.

Example 13 provides the antenna assembly according to example 12, where the transmission line further includes a third portion (e.g., a portion 219-3) between the first portion of the transmission line and the second portion of the transmission line, the third portion of the transmission line being substantially parallel to a line between the second via connection point in the antenna patch and the first via connection point in the antenna patch.

Example 14 provides the antenna assembly according to any one of examples 10-13, where the antenna patch, the first via, the second via, the first opening, the second opening, and the transmission line in the first layer over the support structure are included in an antenna element of the antenna assembly, the antenna element is one of a plurality of antenna elements of the antenna assembly, and individual ones of the plurality of antenna elements are substantially identical except for their orientation with respect to one another.

Example 15 provides the antenna assembly according to example 14, where each antenna element of the plurality of antenna elements is equally and progressively rotated in orientation with respect to its adjacent antenna elements.

Example 16 provides the antenna assembly according to any one of examples 10-13, where the antenna patch, the first via, the second via, the first opening, the second opening, and the transmission line in the first layer over the support structure are included in an antenna element of the antenna assembly, the antenna element is one of a plurality of antenna elements of the antenna assembly, and each antenna element of the plurality of antenna elements is equally and progressively rotated in orientation with respect to its adjacent antenna elements.

Example 17 provides the antenna assembly according to any one of examples 14-16, where the plurality of antenna elements includes a first antenna element, a second antenna element, a third antenna element, and a fourth antenna element, and during operation of the antenna assembly a signal provided to the first antenna element has a substantially 90 degrees phase shift with respect to a signal provided to the second antenna element, a signal provided to the third antenna element has a substantially 90 degrees phase shift with respect to the signal provided to the second antenna element and a substantially 180 degrees phase shift with respect to the signal provided to the first antenna element, and a signal provided to the fourth antenna element has a substantially 90 degrees phase shift with respect to the signal provided to the fourth antenna element, a substantially 180 degrees phase shift with respect to the signal provided to the second antenna element, and a substantially 270 degrees phase shift with respect to the signal provided to the first antenna element.

Example 18 provides the antenna assembly according to any one of examples 14-17, where the plurality of antenna elements are included in a super-element (e.g., a super-element 200) of the antenna assembly, and the super-element is one of a plurality of super-elements of the antenna assembly (e.g., different instances of the super-element 200 may implement different ones of the antenna elements 112 of the antenna array 110).

Example 19 provides the antenna assembly according to example 18, further including one or more beamformers coupled to one or more of the plurality of super-elements of the antenna assembly.

Example 20 provides the antenna assembly according to any one of examples 1-13, where the antenna patch, the first via, the second via, the first opening, and the second opening are included in an antenna element of the antenna assembly, where the antenna element is one of a plurality of antenna elements of the antenna assembly, and where individual ones of the plurality of antenna elements are substantially identical except for their orientation with respect to one another.

Example 21 provides the antenna assembly according to example 20, where each antenna element of the plurality of antenna elements is equally and progressively rotated in orientation with respect to its adjacent antenna elements.

Example 22 provides the antenna assembly according to any one of examples 1-13, where the antenna patch, the first via, the second via, the first opening, and the second opening are included in an antenna element of the antenna assembly, where the antenna element is one of a plurality of antenna elements of the antenna assembly, and where each antenna element of the plurality of antenna elements is equally and progressively rotated in orientation with respect to its adjacent antenna elements.

Example 23 provides the antenna assembly according to any one of examples 20-22, where the plurality of antenna elements includes a first antenna element, a second antenna element, a third antenna element, and a fourth antenna element, and, during operation of the antenna assembly, a signal provided to the first antenna element has a substantially 90 degrees phase shift with respect to a signal provided to the second antenna element, a signal provided to the third antenna element has a substantially 90 degrees phase shift with respect to the signal provided to the second antenna element and a substantially 180 degrees phase shift with respect to the signal provided to the first antenna element, and a signal provided to the fourth antenna element has a substantially 90 degrees phase shift with respect to the signal provided to the fourth antenna element, a substantially 180 degrees phase shift with respect to the signal provided to the second antenna element, and a substantially 270 degrees phase shift with respect to the signal provided to the first antenna element.

Example 24 provides the antenna assembly according to any one of examples 20-23, where the plurality of antenna elements are included in a super-element (e.g., a super-element 200) of the antenna assembly, and the super-element is one of a plurality of super-elements of the antenna assembly (e.g., different instances of the super-element 200 may implement different ones of the antenna elements 112 of the antenna array 110).

Example 25 provides the antenna assembly according to example 24, further including one or more beamformers coupled to one or more of the plurality of super-elements of the antenna assembly.

Example 26 provides the antenna assembly according to any one of the preceding examples, further including one or more additional openings (e.g., openings 220) in the electrically conductive material of the antenna patch.

Example 27 provides the antenna assembly according to example 26, where the one or more additional openings are at least partially filled with a dielectric material, which may be either a solid dielectric material such as any solid dielectric material that may be depositing within openings in an IC structure using conventional techniques (e.g., using spin-coating or dip-coating) or a gaseous dielectric such as air.

Example 28 provides the antenna assembly according to any one of the preceding examples, where the first opening is at least partially filled with a dielectric material, which may be either a solid dielectric material such as any solid dielectric material that may be depositing within openings in an IC structure using conventional techniques (e.g., using spin-coating or dip-coating) or a gaseous dielectric such as air. The same applies to the second opening.

Example 29 provides the antenna assembly according to any one of the preceding examples, where the first opening extends (i.e., is continuous), in a direction substantially perpendicular to the support structure, between the first layer and the second layer.

Example 30 provides the antenna assembly according to any one of the preceding examples, where the second layer is closer to the support structure than the first layer.

Example 31 provides an antenna assembly that includes a two-by-two array of antenna patches, where each antenna patch is equally and progressively rotated in orientation with respect to its adjacent antenna patches, and each antenna patch includes a layer of an electrically conductive material that is patterned as a polygon and includes a first ring-shaped opening that is continuous in enclosing a first portion of the electrically conductive material of the antenna patch except for a first transmission line connecting the first portion of the electrically conductive material of the antenna patch enclosed by the first ring-shaped opening and a portion of the electrically conductive material of the antenna patch outside the first ring-shaped opening, and a second ring-shaped opening that is continuous in enclosing a second portion of the electrically conductive material of the antenna patch except for a second transmission line connecting the second portion of the electrically conductive material of the antenna patch enclosed by the second ring-shaped opening and a portion of the electrically conductive material of the antenna patch outside the second ring-shaped opening, where the first transmission line is substantially perpendicular to the second transmission line.

Example 32 provides the antenna assembly according to example 31, further including a respective transmission line (e.g., a transmission line 218) proximate to, and partially surrounding, a different antenna patch of the two-by-two array of antenna patches.

Example 33 provides the antenna assembly according to example 32, where the transmission line is floating during operation of the antenna assembly.

Example 34 provides an antenna apparatus that includes an antenna assembly according to any one of examples 1-30.

Example 35 provides the antenna apparatus according to example 34, further including a beamformer array coupled to the antenna assembly.

Example 36 provides the antenna apparatus according to examples 34 or 35, further including an up- or down-converter (UDC) circuit coupled to the beamformer array.

Example 37 provides the antenna apparatus according to any one of examples 34-36, further including other components, e.g., those shown in FIG. 1.

The invention claimed is:

1. An antenna assembly, comprising:

a support structure;

an antenna patch of an electrically conductive material in a first layer over the support structure;

a first via, extending between a first via connection point in a second layer over the support structure and a first via connection point in the antenna patch;

a second via, extending between a second via connection point in the second layer over the support structure and a second via connection point in the antenna patch;

a first opening in the electrically conductive material of the antenna patch, partially enclosing the first via connection point in the antenna patch so that a first portion of the electrically conductive material of the antenna patch is between a portion of the electrically conductive material of the antenna patch partially within the first opening and a portion of the electrically conductive material of the antenna patch outside the first opening;

a second opening in the electrically conductive material of the antenna patch, partially enclosing the second via connection point in the antenna patch so that a second portion of the electrically conductive material of the antenna patch is between a portion of the electrically conductive material of the antenna patch partially within the second opening and a portion of the electrically conductive material of the antenna patch outside the second opening; and a transmission line in the first layer over the support structure, wherein the transmission line is at a distance to, and partially encloses, the antenna patch, wherein the first portion of the electrically conductive material of the antenna patch is substantially perpendicular to the second portion of the electrically conductive material of the antenna patch.

2. The antenna assembly according to claim 1, wherein the first opening is a continuous opening that encloses the first via connection point in the antenna patch except for the first portion of the electrically conductive material of the antenna patch.

3. The antenna assembly according to claim 2, wherein the first opening is a ring-shaped opening.

4. The antenna assembly according to claim 1, wherein a portion of the first opening is in contact with a portion of the second opening.

5. The antenna assembly according to claim 1, wherein the transmission line is a first transmission line, the antenna assembly further comprising:

a second transmission line that extends between the first via connection point in the second layer and the second via connection point in the second layer.

6. The antenna assembly according to claim 5, wherein the second transmission line is a quarter-wavelength transmission line.

7. The antenna assembly according to claim 1, wherein the transmission line is floating during operation of the antenna assembly.

8. The antenna assembly according to claim 1, wherein the transmission line includes:

a first portion that is substantially perpendicular to a line between the first via connection point in the antenna patch and the first portion of the electrically conductive material of the antenna patch, and a second portion that is substantially perpendicular to a line between the second via connection point in the antenna patch and the second portion of the electrically conductive material of the antenna patch.

9. The antenna assembly according to claim 8, wherein the transmission line further includes a third portion between the first portion of the transmission line and the second portion of the transmission line, the third portion of the transmission line being substantially parallel to a line between the second via connection point in the antenna patch and the first via connection point in the antenna patch.

10. The antenna assembly according to claim 1, wherein:

the antenna patch, the first via, the second via, the first opening, the second opening, and the transmission line in the first layer over the support structure are included in an antenna element of the antenna assembly, the antenna element is one of a plurality of antenna elements of the antenna assembly, and individual ones of the plurality of antenna elements are substantially identical except for their orientation with respect to one another.

11. The antenna assembly according to claim 1, wherein:

the antenna patch, the first via, the second via, the first opening, the second opening, and the transmission line in the first layer over the support structure are included in an antenna element of the antenna assembly, the antenna element is one of a plurality of antenna elements of the antenna assembly, and each antenna element of the plurality of antenna elements is equally and progressively rotated in orientation with respect to its adjacent antenna elements.

12. The antenna assembly according to claim 11, wherein:

the plurality of antenna elements includes a first antenna element, a second antenna element, a third antenna element, and a fourth antenna element, and during operation of the antenna assembly:

a signal provided to the first antenna element has a substantially 90 degrees phase shift with respect to a signal provided to the second antenna element, a signal provided to the third antenna element has a substantially 90 degrees phase shift with respect to the signal provided to the second antenna element and a substantially 180 degrees phase shift with respect to the signal provided to the first antenna element, and a signal provided to the fourth antenna element has a substantially 90 degrees phase shift with respect to the signal provided to the fourth antenna element, a substantially 180 degrees phase shift with respect to the signal provided to the second antenna element, and a substantially 270 degrees phase shift with respect to the signal provided to the first antenna element.

13. The antenna assembly according to claim 11, wherein:

the plurality of antenna elements are included in a super-element of the antenna assembly, and the super-element is one of a plurality of super-elements of the antenna assembly.

14. The antenna assembly according to claim 1, further comprising one or more additional openings in the electrically conductive material of the antenna patch.

15. The antenna assembly according to claim 14, wherein the one or more additional openings are at least partially filled with a dielectric material.

16. The antenna assembly according to claim 1, wherein the first opening is at least partially filled with a dielectric material.

17. An antenna assembly, comprising:

a two-by-two array of antenna patches, wherein:

each antenna patch is equally and progressively rotated in orientation with respect to its adjacent antenna patches, and each antenna patch includes a layer of an electrically conductive material that is patterned as a polygon and includes:

a first ring-shaped opening that is continuous in enclosing a first portion of the electrically conductive material of the antenna patch except for a first transmission line connecting the first portion of the electrically conductive material of the antenna patch enclosed by the first ring-shaped opening and a portion of the electrically conductive material of the antenna patch outside the first ring-shaped opening, and a second ring-shaped opening that is continuous in enclosing a second portion of the electrically conductive material of the antenna patch except for a second transmission line connecting the second portion of the electrically conductive material of the antenna patch enclosed by the second ring-shaped opening and a portion of the electrically conductive material of the antenna patch outside the second ring-shaped opening, wherein the first transmission line is substantially perpendicular to the second transmission line.

18. The antenna assembly according to claim 17, further comprising a respective transmission line proximate to, and partially surrounding, a different antenna patch of the two-by-two array of antenna patches.

19. The antenna assembly according to claim 18, wherein the first transmission line is floating during operation of the antenna assembly.

20. An antenna apparatus, comprising:

an antenna assembly comprising:

a support structure;

an antenna patch of an electrically conductive material in a first layer over the support structure;

a first via, extending between a first via connection point in a second layer over the support structure and a first via connection point in the antenna patch;

a second via, extending between a second via connection point in the second layer and a second via connection point in the antenna patch;

a first opening in the electrically conductive material of the antenna patch, partially enclosing the first via connection point in the antenna patch so that a first portion of the electrically conductive material of the antenna patch is between a portion of the electrically conductive material of the antenna patch partially within the first opening and a portion of the electrically conductive material of the antenna patch outside the first opening;

a second opening in the electrically conductive material of the antenna patch, partially enclosing the second via connection point in the antenna patch so that a second portion of the electrically conductive material of the antenna patch is between a portion of the electrically conductive material of the antenna patch partially within the second opening and a portion of the electrically conductive material of the antenna patch outside the second opening; and a transmission line in the first layer, wherein the transmission line is at a distance to the antenna patch, wherein the first portion of the electrically conductive material of the antenna patch is substantially perpendicular to the second portion of the electrically conductive material of the antenna patch;

a beamformer array coupled to the antenna assembly; and an upconverter and/or downconverter (UDC) coupled to the beamformer array.

* * * * *